(12) United States Patent
Ziolkowski et al.

(10) Patent No.: US 11,279,783 B2
(45) Date of Patent: Mar. 22, 2022

(54) PHOTO-RESPONSIVE SPIROPYRAN-BASED N-ISOPROPYLACRYLAMIDE (NIPAM) GELS

(71) Applicant: Dublin City University, Dublin (IE)

(72) Inventors: Bartosz Ziolkowski, Poznan (PL); Larisa Elena Florea, Deva (RO); Dermot Diamond, Dublin (IE)

(73) Assignee: DUBLIN CITY UNIVERSITY, Dublin (IE)

( * ) Notice: Subject to any disclaimer, the term of this patent is extended or adjusted under 35 U.S.C. 154(b) by 150 days.

(21) Appl. No.: 14/907,162

(22) PCT Filed: Jul. 23, 2014

(86) PCT No.: PCT/EP2014/065861
§ 371 (c)(1),
(2) Date: Jan. 22, 2016

(87) PCT Pub. No.: WO2015/011211
PCT Pub. Date: Jan. 29, 2015

(65) Prior Publication Data
US 2016/0158754 A1 Jun. 9, 2016

(30) Foreign Application Priority Data
Jul. 24, 2013 (GB) ................................. 1313220

(51) Int. Cl.
*B01L 3/00* (2006.01)
*C08J 9/26* (2006.01)
(Continued)

(52) U.S. Cl.
CPC .... *C08F 222/385* (2013.01); *B01L 3/502738* (2013.01); *C08F 2/48* (2013.01);
(Continued)

(58) Field of Classification Search
CPC ........... B01L 3/502738; B01L 2300/12; B01L 2400/0672; B01L 2200/06;
(Continued)

(56) References Cited

U.S. PATENT DOCUMENTS 8,163,834 B2 * 4/2012 Byrne ................... B32B 27/08
524/548
2004/0242770 A1 * 12/2004 Feldstein ............. A61K 8/0208
525/54.3
(Continued)

OTHER PUBLICATIONS

Acciaro et al., "Preparation of Monodisperse Poly(N-isopropylacrylamide) Microgel Particles with Homogenous Cross-Link Density Distribution," *Langmuir* 27:7917-7925, 2011.
(Continued)

*Primary Examiner* — Rebecca M Fritchman
(74) *Attorney, Agent, or Firm* — Cozen O'Connor

(57) ABSTRACT

The present teaching relates to photo-responsive hydrogels comprising a copolymer comprising N-isopropylacrylamide (NIPAM), a polymerisable derivative of benzospiropyran, a cross-linking agent and an acid, the acid having a pKa of less than 6, wherein the hydrogel is operably responsive to exposure to water so as to undergo spontaneous protonation and swelling. The photo-responsive hydrogels described can be used in the field of microfluidic platforms.

19 Claims, 17 Drawing Sheets

X:Y:Z:C =5:1:100:3.

(51) Int. Cl.
C08F 222/38 (2006.01)
C08F 2/48 (2006.01)
C08F 220/54 (2006.01)

(52) U.S. Cl.
CPC .............. C08F 220/54 (2013.01); C08J 9/26 (2013.01); B01L 2200/06 (2013.01); B01L 2300/12 (2013.01); B01L 2400/0672 (2013.01); C08J 2201/046 (2013.01); C08J 2205/022 (2013.01); C08J 2333/24 (2013.01)

(58) Field of Classification Search
CPC .. C08J 2201/046; C08J 9/26; C08J 2205/022; C08J 2333/24; C08F 222/385; C08F 220/54; C08F 2/48; C08F 220/36; C08F 222/38
USPC .................. 422/502; 521/149, 50.5; 522/64; 526/259
See application file for complete search history.

(56) References Cited

U.S. PATENT DOCUMENTS

| | | | |
|---|---|---|---|
| 2008/0044472 | A1 | 2/2008 | Garcia et al. |
| 2009/0130773 | A1* | 5/2009 | Ayi .................... G01N 21/6428 436/172 |
| 2010/0239647 | A1 | 9/2010 | Byrne et al. |
| 2012/0040397 | A1* | 2/2012 | Luo .......................... A61K 9/06 435/68.1 |
| 2013/0110040 | A1* | 5/2013 | Serpe ................ A61K 41/0028 604/93.01 |

OTHER PUBLICATIONS

Anseth et al., "Mechanical properties of hydrogels and their experimental determination," *Biomaterials* 17(17): 1647-1657, 1996.
Beebe et al., "Functional hyrdrogel structures for autonomous flow control inside microfluidic channels," *Nature* 404:588-590, Apr. 2000.
Benito-Lopez et al., "Ionogel-based light-actuated valves for controlling liquid flow in micro-fluidic manifolds," *Lab Chip* 10:195-201, 2010.
Byrne et al., "Designer molecular probes for phosphonium ionic liquids," *Phys. Chem. Chem. Phys.* 12:1895-1904, 2010.
Chaterji et al., "Smart polymeric gels: Redefining the limits of biomedical devices," *Prog. Polym. Sci* 32:1083-1122, 2007.
Chen et al., "Light-actuated high pressure-resisting microvalve for on-chip flow control based on thermos-responsive nanostructured polymer," *Lab Chip* 8:1198-1204, 2008.
Chen et al., Photodeformable CLCP material: study on photoactivated microvalve applications, *Appl Phys A* 102:667-672, 2011.
Dong et al., "Autonomous microfluidics with stimuli-responsive hydrogels," *Soft Matter* 3:1223-1230, 2007.
Echeverria et al., "Novel strategy for the determination of UCST-like microgels network structure: effect on swelling behavior and rheology," *Soft Matter* 8:337-346, 2012.
Florea et al., "Photo-Responsive Polymeric Structures Based on Spiropyran," *Marcomol. Mater. Eng.* 297:1148-1159, 2012.
Geiger et al., "A Polymer-Based Micofluidic Platform Featuring On-Chip Actuated Hydrogel Valves for Disposable Applications," *Journal of Microelectromechanical Systems* 19(4):944-950, Aug. 2010.

Great Britain combined Search and Examination Report under sections 17 and 18(3) dated Jan. 24, 2014, for GB Application No. GB1313220.4, 7 pages.
International Preliminary Report on Patentability, dated Jul. 23, 2014, for International Application No. PCT/EP2014/065861, 7 pages.
International Search Report and Written Opinion, dated Oct. 17, 2014, for International Application No. PCT/EP2014/065861, 12 pages.
Li et al., "Synthesis of optically active macroporous poly(N-isopropylacrylamide) hydrogels with helical poly(N-propargylamide) for chiral recognition of amino acids," *Reactive & Functional Polymers* 71:972-979, 2011.
Lo et al., "An infrared-light responsive graphene-oxide incorporated poly(N-isopropylacrylamide) hydrogel nanocomposite," *Soft Matter* 7:5604-5609, 2011.
Philippova et al., "pH-Responsive Gels of Hydrophobically Modified Poly(acrylic acid)," *Macromolecules* 39:8278-8285, 1997.
Satoh et al., "Fast-reversible light-driven hydrogels consisting of spirobenzopyran-functionalized poly (N-isopropylacrymide)," *Soft Matter* 7:8030-8034, 2011.
Satoh et al., "Isomerization of spirobenzopyrans bearing electron-donating and electron-withdrawing groups in acidic aqueous solutions," *Phys. Chem. Chem. Phys.* 13:7322-7329, 2011.
Schild et al., "Poly (N-Isopropylacrylamide): Experiment, Theory and Application," *Prog. Polym. Sci.* 17:163-249, 1992.
Sershen et al., "Independent Optical Control of Microfluidic Valves Formed from Optomechanically Responsive Nanocomposite Hydrogels," *Adv. Mater* 17:1366-1368, 2005.
Sugiura et al., "On-demand microfluidic control by micropatterned light irradiation of a photoresponsive hydrogel sheet," *Lab Chip* 9:196-198, 2009.
Sugiura et al., "Photoresponsive polymer gel microvalves controlled by local light irradiation," *Sensors and Actuators A* 140:176-184, 2007.
Sumaru et al., "Characteristic Phase Transition of Aqueous Solution of Poly (N-isopropylacrylamide) Functionalized with Spirobenzopyran,"*Macromolecules* 37:4949-4955, 2004.
Sumaru et al., "Photoresponsive Properties of Poly(N-isopropylacrylamide) Hydrogel Partly Modified with Spirobenzopyran," *Langmuir* 22:4353-4356, Mar. 2006.
Sumaru et al., "Reversible and Efficient Proton Dissociation of Spirobenzopyran-Functionalized Poly (N-isopropylacrylamide) in Aqueous Solution Triggered by Light Irradiation and Temporary Temperature Rise," *Macromolecules* 37:7854-7856, 2004.
Szilágyi et al., "Rewritable Microrelief Formation on Photoresponsive Hydrogel Layers," *Chem. Mater.* 19:2739-2732, Apr. 2007.
Wu et al., "Synthesis and Characterization of Thermally Reversible Macroporous Poly (N-Isopropylacrylamide) Hydrogels," *Journal of Polymer Science: Part A: Polymer Chemistry* 30:2121-2129, 1992.
Wu et al., "Volume Phase Transition of Swollen Gels: Discontinuous or Continuous?" *Macromolecules* 30:514-516, 1997.
Zhang et al., "Preparation and Characterization of Fast Response Macroporous Poly(N-isopropylacrylamide) Hydrogels," *Langmuir* 17:6094-6099, 2001.
Ziólkowski et al., "Self-protonating spiropyran-co-NIPAM-co-acrylic acid hydrogel photoactuators," *Soft Matter* 9:8754-8760, 2013.
Ziólkowski et al., "Mechanical Properties and UV Curing Behavior of Poly(N-Isopropylacrylamide) in Phosphonium-Based Ionic Liquids," *Macromol. Chem. Phys* 214:787-796, 2013.

\* cited by examiner

X:Y:Z:C =5:1:100:3.

X:Y:Z = 5:1:100

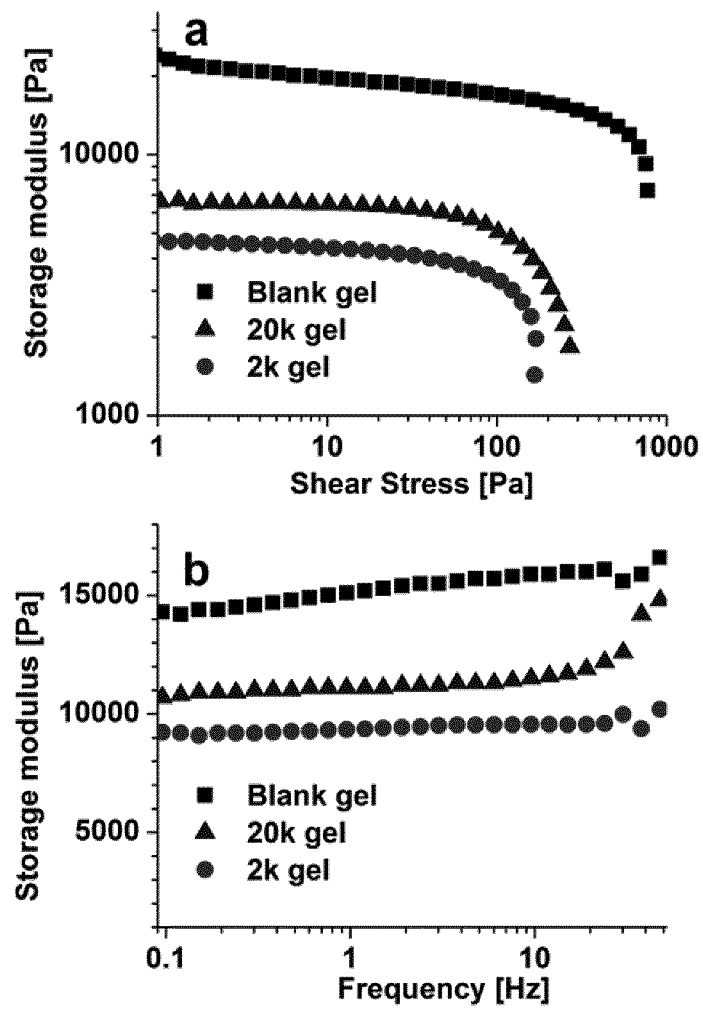
Figure 12 (a) and Figure 12(b)

PHOTO-RESPONSIVE SPIROPYRAN-BASED N-ISOPROPYLACRYLAMIDE (NIPAM) GELS

FIELD

The present invention relates to spiropyran-based N-isopropylacrylamide (NIPAM) gels. In particular, the invention relates to photo-responsive and reversible spiropyran-based N-isopropylacrylamide (NIPAM) hydrogels.

BACKGROUND

Photo-responsive hydrogels have become popular in recent times, particularly in the field of microfluidics as they have the ability to undergo volumetric changes in response to an external light stimulus. A hydrogel is defined as a network of hydrophilic polymer chains that is able to swell and retain large amounts of water. In a well-swollen hydrogel, up to 95% of its mass can consist of water that has been absorbed in its three dimensional swollen network. Hydrogels possess excellent biocompatibility and have a degree of flexibility which is very similar to natural tissue thereby enabling them to be used in the field of microfluidic devices. In particular, photo-responsive engineered hydrogels can be made to shrink, thereby releasing a percentage of their water content upon light irradiation. Polymeric actuators comprising such gels are often used in the manufacture of microvalves.

Photo-responsive gels based on N-isopropylacrylamide and spiropyran have been the subject of investigation in recent years (K. Sumaru, K. Ohi, T. Takagi, T. Kanamori and T. Shinbo, *Langmuir*, 2006, 22, 4353-4356; A. Szilágyi, K. Sumaru, S. Sugiura, T. Takagi, T. Shinbo, M. Zrínyi and T. Kanamori, *Chem. Mater.*, 2007, 19, 2730-2732; S. Sugiura, A. Szilagyi, K. Sumaru, K. Hattori, T. Takagi, G. Filipcsei, M. Zrinyi and T. Kanamori, *Lab Chip*, 2009, 9, 196-198; T. Satoh, K. Sumaru, T. Takagi and T. Kanamori, *Soft Matter*, 2011, 7, 8030-8034; L. Florea, D. Diamond and F. Benito-Lopez, *Macro. Mat. Eng.*, 2012, 297, 1148-1159.) These known gels actuate on the following principle. A spiropyran-acrylate photo-switch molecule is incorporated into an N-isopropylacrylamide thermoresponsive hydrogel. The photo-switch can exist in two isomer forms, the hydrophobic, closed spiropyran (BSP) and the more hydrophilic open merocyanine form (MC) that can also become protonated merocyanine (MC-H$^+$). When such gel is placed in a milimolar HCl solution the photo-switch isomerises from BSP to MC-H$^+$. The gel swells and becomes yellow. When this swollen gel is irradiated with light of the wavelength of the absorption of the protonated MC-H$^+$ (e.g. white LED light) the photo-switch molecule reverts back to the more hydrophobic and colourless BSP form. As a consequence the hydrophilicity of the material changes and the gel shrinks.

The use of photo-responsive gels in the field of microfluidic valves (Sugiura, S.; Sumaru, K.; Ohi, K.; Hiroki, K.; Takagi, T.; Kanamori, T., Photoresponsive polymer gel microvalves controlled by local light irradiation. *Sensors and Actuators A: Physical* 2007, 140, 176-184) and on demand patterned channels (Sugiura, S.; Szilagyi, A.; Sumaru, K.; Hattori, K.; Takagi, T.; Filipcsei, G.; Zrinyi, M.; Kanamori, T. *Lab Chip* 2009, 9, (2), 196-198) is known. In the case of micro-valves the gel, when swollen, blocks the channel and when light induced shrinking of the gel occurs the channel is opened. In the case of patterned channels a whole sheet of photo-responsive gel is placed under a microfluidic chip inlet/outlet system having no channels. Irradiation with light through a mask allows shrinking of the gel to occur only along the exposed lines resulting in formation of channels between external fluid inlets and outlets (Sugiura, S.; Szilagyi, A.; Sumaru, K.; Hattori, K.; Takagi, T.; Filipcsei, G.; Zrinyi, M.; Kanamori, T. *Lab Chip* 2009, 9, (2), 196-198.)

However, the shrinking time of these materials is several minutes, which is not ideal for a fast fluid handling and valve operation. Improvements in this regard have been published by Satoh et al. (T. Satoh, K. Sumaru, T. Takagi and T. Kanamori, *Soft Matter*, 2011, 7, 8030-8034; T. Satoh, K. Sumaru, T. Takagi, K. Takai and T. Kanamori, *Phys. Chem. Chem. Phys.*, 2011, 13, 7322-7329). In order to speed up the kinetics of spiropyran opening and closing, Satoh et al. attached different electron donating/withdrawing substituents on the spiropyran molecule and then copolymerised it with N,N-dimethylacrylamide. The resulting polymer showed improved protonation rates compared to equivalent non-functionalised spiropyran. The best performing modified spiropyran molecules were then incorporated into poly(NIPAM) gels and showed different speeds of reversible gel shrinking. The "fastest" gel shrunk in 10 min and reswelled back to ~95% of the original size also within 10 min. It must be noted here that these gels were 300 μm diameter rods.

US Patent Publication No. 2008/0044472 A1 describes photo-responsive hydrogels. The compositions disclosed are prepared by polymerizing a hydrogel precursor with a spiropyran. The properties of the disclosed compositions can be changed by exposure to light, pH and temperature.

US Patent Publication No. 2010/0239647 A1 relates to a photo-responsive ionogel comprising a photo-responsive polymer polymerized within an ionic liquid matrix. The solid-state electrolyte material maintains its ionic liquid characteristics but these characteristics can be altered upon irradiation of the gel with light of a particular wavelength.

US Patent Publication No. 2009/0093601 A1 describes a compound comprising a photochromic moiety and at least one substituent comprising a polymer chain having a carbon backbone and a plurality of functional moieties appended to the carbon backbone. It relates to photochromic compounds and to the use of those compounds to allow the fade speed of the photochrome to be changed without changing its colour.

Although various spiropyran-based photo-responsive actuators, including hydrogels and ionogels, have been developed for use in microfluidic devices, there are still several challenges that need to be addressed. For example, these actuators have not been broadly exploited in microfluidic devices due to significant performance limitations.

For example, NIPAM gels that are currently available need to be immersed in hydrochloric acid (HCl) in order for the gel to operate. This presents a serious problem for certain applications of such gels. The protonation of the merocyanine isomer in the gel backbone that allows the photo-induced shrinking requires pre-soaking the gel in ~pH3 HCl solution. In the case of microfluidic valves which are used in microfluidic sensor platforms, having HCl contamination of the sample may render the analysis impossible. More importantly, once the gel shrinks, it expels the HCl, and to re-swell the gel back to the light-responsive state, it needs to be re-soaked in HCl. This makes repeated use of such valves difficult and means that these materials can only be used in "one shot" devices and disposable microfluidic platforms. Consequently, the need to acidify currently available NIPAM gels in order for them to swell and operate is a well-recognized problem inhibiting their broad employment in practical applications of microfluidic devices.

Accordingly there is a need to provide improved gel actuators, in particular improved spiropyran-based poly(NIPAM) gels which do not need to be soaked in HCl in order to function and which are suitable for use in a range of applications such as, for example, microfluidic valves.

SUMMARY

Accordingly, in one aspect, the present teaching provides a photo-responsive hydrogel comprising a copolymer comprising N-isopropylacrylamide (NIPAM), a polymerisable derivative of benzospiropyran, a cross-linking agent and an acid, the acid having a pKa of less than 6, wherein the hydrogel is operably responsive to exposure to water so as to undergo spontaneous protonation.

Preferably, the hydrogel according to the present teaching is operably responsive to exposure to deionised water so as to undergo spontaneous protonation and swelling.

The hydrogel according to the present teaching exhibits photo-induced shrinking upon white light irradiation.

The term "polymerisable derivative of benzospiropyran" as used herein means a derivative of benzospiropyran that is capable of being polymerised. The polymerisable derivative of benzospiropyran suitably comprises at least one acrylate group.

Preferably, the polymerisable derivative of benzospiropyran comprises benzospiropyran acrylate (BSP-A).

The acid is suitably a monomeric acid, that is, an acid whose molecules can join together to form polymers. In particular, the acid is suitably an acid molecule containing a group within its molecule that allows incorporation of the acid into a copolymer. To ensure effective protonation of the MC, the acid used in accordance with the present teaching suitably has a pK$_a$ such that it will be more acidic than the spiropyran/merocyanine. Therefore, as the reported pK$_a$ of the MC-H$^+$ used in the present teaching is ~6-7, the pKa of the acid should be less than 6.

The acid may be selected from the group consisting of acrylic acid, methacrylic acid, 2-ethylacrylic acid, 2-propylacrylic acid, 2-(Trifluoromethyl)acrylic acid, 2-(Bromomethyl)acrylic acid, 2-Bromacrylic acid, vinylsulphonic acid, 4-styrenesulfonic acid, 2-Acrylamido-2-methyl-1-propanesulfonic acid and vinylphosphonic acid. The skilled person will appreciate that other suitable acids may also be used.

Preferably, the acid is acrylic acid (AA).

The cross-linking agent may be selected from the group consisting of N,N'-methylenebisacrylamide (MBIS), N,N'-ethylenebisacrylamide, butanediol diacrylate, hexanedioldiacrylate, poly(ethyleneglycol) diacrylate and poly(propyleneglycol) diacrylate. The skilled person will appreciate that any other suitable cross-linking agent may also be used.

In one aspect of the present teaching the photo-responsive hydrogel comprises a copolymer comprising AA-co-BSP-A-co-NIPAM-co-MBIS.

The photo-responsive hydrogel may comprise NIPAM in an amount of 100 mol %; BSP-A in an amount in the range 1 to 3 mol %, acrylic acid (AA) in an amount in the range 1 to 15 mol % and MBIS in an amount in the range 0.1 to 3 mol %.

Preferably, the photo-responsive hydrogel comprises AA-co-BSP-A-co-NIPAM-co-MBIS having the structure

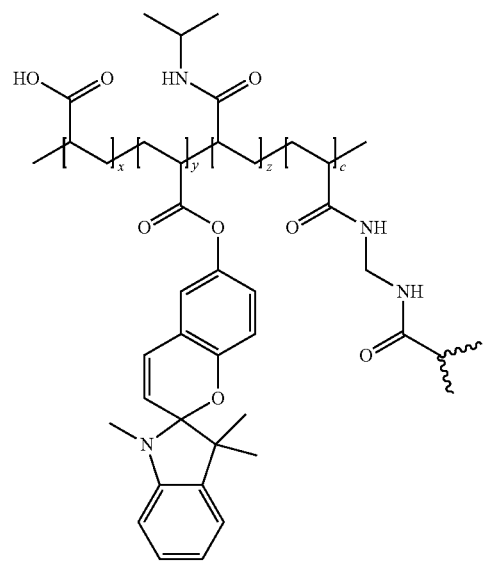

preferably wherein X:Y:Z:C=5:1:100:3.

The inventors have found that the incorporation of an acidic unit, such as acrylic acid for example, in the polymer matrix by polymerisation, enables automatic acidification of the gel when it is placed in water. This allows the gel to work immediately after it is swollen in water. This result is surprising and is particularly advantageous as the gels according to the present teaching do not need to be soaked in HCL in order to activate the gels. The incorporation of the acid, such as acrylic acid for example, in the polymer immobilises the acid allowing the gel to be re-acidified repeatedly. Therefore the gels according to the present teaching are re-usable.

Preferably, the ratio of acrylic acid to spiropyran acrylate BSP-A is 5 mol %:1 mol %. The molar percent refers to the total moles of NIPAM used.

By optimising the ratio of the acrylated spiropyran unit and the acidic unit (acrylic acid unit) inside the polymeric matrix, the kinetics of the shrinking/swelling process can be enhanced.

The hydrogels according to the present teaching demonstrate higher values of shrinking compared to standard spiropyran gels that need to be protonated by soaking in hydrochloric acid.

Suitably the photo-responsive hydrogel according to the present teaching shrinks by an amount in the range 1 to 90% upon white light irradiation for a period of 0.01 seconds to 30 minutes.

Further, suitably, the photo-responsive hydrogel according to the present teaching shrinks by an amount in the range 5 to 70% upon white light irradiation for a period of 1 second to 20 minutes.

Suitably, the photo-responsive hydrogel described herein which comprises 1 mol % BSP-A re-swells to 95 to 100% of its initial diameter upon exposure to water, suitably in darkness, for a period of 0.1-60 minutes.

The term "darkness" as used herein means an environment wherein the amount of light available is insufficient to effect shrinking of the photo-responsive hydrogel.

The photo-responsive hydrogel may be prepared using a mixture which comprises a pore-forming agent. The pore-forming agent is suitably present in the mixture during polymerisation but is typically removed by leaching afterwards.

The pore-forming agent may be selected from the group consisting of poly(ethylene glycol), glucose, an inorganic salt, a solvent or a mixture of solvents. The solvent or mixture of solvents that may be used as a pore-forming agent may be for example, solvent(s) used for polymerisation that are miscible with the monomers but which precipitate the polymer as it is formed. These mixtures of solvent include, but are not restricted to: acetone:water, 1,4-dioxane:water, tetrahydrofuran:water, acetonitrile:water.

Preferably the pore-forming agent comprises poly(ethylene glycol) (PEG) having a molecular weight in the range of 2000 g/mol to 20,000 g/mol.

Suitably, the photo-responsive hydrogel formed using a mixture comprising PEG is porous. The porous photo-responsive hydrogel may re-swell to 50% of its initial diameter within a period of 1 to 30 minutes upon exposure to water, suitably in darkness. Preferably, the porous photo-responsive hydrogel may re-swell to 95-100% of its initial diameter within a period of 10-25 minutes upon exposure to water, suitably in darkness.

Suitably, the photo-responsive hydrogel formed using a solvent mixture for polymerisation (e.g. acetone:water, 1,4-dioxane:water, tetrahydrofuran:water, acetonitrile:water) is porous and may re-swell to 50% of its initial diameter within a period of 1 to 30 minutes upon exposure to water, suitably in darkness. Preferably, the porous photo-responsive hydrogel may re-swell to 95-100% of its initial diameter within a period of 10-25 minutes upon exposure to water, suitably in darkness.

Suitably, the photo-responsive hydrogel according to one aspect of the present teaching exhibits reproducible light induced shrinking after storage in water, suitably in darkness, for a period of two months. The inventors have found that the hydrogel comprising 5 mol % AA and 1 mol % BSP-A is stable even after being stored in water for a period of 2 months. This surprising and unexpected technical effect of reproducible light-induced shrinking even after storage for two months in water or after several drying/swelling cycles demonstrates that the hydrogels described herein have a good level of robustness. This effect is highly desirable.

The photo-responsive hydrogel according to the present teaching is reusable. This means that the gel can be actuated repeatedly. This feature provides a significant advantage over known gels.

In a further aspect, the present teaching provides a process for the preparation of a photo-responsive hydrogel described herein, the process comprising the steps of
  (a) mixing N-isopropylacrylamide (NIPAM), a cross-linking agent, a polymerisable derivative of benzospiropyran and an acid having a pKa less than 6;
  (b) dissolving said mixture in an organic solvent or solvent mixtures (e.g. acetone:water, 1,4-dioxane:water, tetrahydrofuran:water, acetonitrile:water);
  (c) adding an initiator; and
  (d) polymerising with white or UV light.

In the process according to the present teaching, the initiator may comprise a white light photo-initiator, such as (Phenylbis(2,4,6 trimethyl benzoyl)phosphine oxide (PBO), for example. In this aspect of the present teaching, polymerisation is conducted using white light.

Further, in accordance with the present teaching, the initiator may comprise a UV-initiator. In this aspect of the present teaching, polymerisation is conducted using UV light.

In a preferred aspect of the process according to the present teaching the polymerisable derivative of benzospiropyran comprises benzospiropyran acrylate.

The acid may be selected from the group consisting of acrylic acid, 2-(Bromomethyl)acrylic acid, 2-Bromacrylic acid, methacrylic acid, 2-ethylacrylic acid, 2-propylacrylic acid, 2-(Trifluromethyl)acrylic acid, vinylsulphonic acid, 4-styrenesulfonic acid, 2-Acrylamido-2-methyl-1-propanesulfonic acid and vinylphosphonic acid. The skilled person will appreciate that other suitable acids could also be used.

Preferably, the acid is acrylic acid.

The cross-linking agent may be selected from the group consisting of N,N'-methylenebisacrylamide (MBIS), N,N'-ethylenebisacrylamide, butanediol diacrylate, hexanedioldiacrylate, poly(ethyleneglycol) diacrylate and poly(propyleneglycol) diacrylate. The skilled person will appreciate that any other suitable cross-linking agent may also be used in the process.

The process may further comprise the step of adding a pore-forming agent to the organic solvent prior to step (b).

Preferably the pore-forming agent comprises poly(ethylene glycol). Further preferably, the pore-forming agent comprises PEG having a molecular weight in the range of 2,000 g/mol to 20,000 g/mol. The skilled person will know that other suitable pore-forming agents may also be used.

The organic solvent may be selected from the group consisting of 1,4-dioxane, ethanol, acetone, tetrahydrofuran (THF), dimethyl sulfoxide (DMSO), and mixtures thereof with water.

The gels according to the present teaching may be porous and photo-responsive. They can function as self-protonating soft hydrogel actuators.

In a further aspect, the present teaching provides a microvalve comprising a channel wherein a photo-responsive hydrogel is placed in the channel to provide functionality to the channel, wherein the microvalve is operably responsive on exposure of the hydrogel to white light to effect opening of the valve and on exposure of the hydrogel to water, suitably in darkness, to effect closing of the valve.

The microvalve preferably comprises a photo-responsive hydrogel comprising a copolymer of N-isopropylacrylamide (NIPAM), N,N'-methylenebisacrylamide, benzospiropyran acrylate (BSP-A) and an acid having a pKa less than 6. The acid may be selected from the group consisting of acrylic acid, 2-(Bromomethyl)acrylic acid, 2-Bromacrylic acid, methacrylic acid, 2-ethylacrylic acid, 2-propylacrylic acid, 2-(Trifluromethyl)acrylic acid, vinylsulphonic acid, 4-styrenesulfonic acid, 2-Acrylamido-2-methyl-1-propanesulfonic acid and vinylphosphonic acid.

In a preferred aspect of the present teaching, the microvalve comprises a photo-responsive hydrogel, comprising a copolymer comprising AA-co-BSP-A-co-NIPAM-co-MBIS.

Suitably the microvalve is operable in a pH range of pH 2 to 7. Valves comprising the gel according to the present teaching are fully operational in neutral conditions. This means that they do not need to be placed in acidic conditions be actuated. The operation of such valves has been extended for a wider pH range compared to known systems.

Further, the microvalve comprising the hydrogel described herein may be re-used. The photoresponsive hydrogel according to the present teaching may be used in microfluidic fluid handling platforms. For example, the valves can be used in reusable microfluidic channels. This is because they do not need to be soaked in hydrochloric acid in order to close them, unlike the NIPAM gels of the prior art.

The hydrogels according to the present teaching function as reversible photoactuators. They can therefore be used in a range of applications such as, for example, a fast "on/off" microfluidic soft actuator valve. There are many advantages of valves which comprise a hydrogel according to the present teaching. For example, a valve comprising such hydrogels can be repeatedly actuated from the outside of the fluidic device. The acid remains in the gel structure and does not leach out. There are no moving parts in such a valve. The light that can be used to actuate the valve is a non-invasive remote trigger.

The present teaching provides a method for operating a microvalve comprising a photo-responsive hydrogel, the method comprising the steps of (i) exposing the hydrogel to white light to effect opening of the valve and (ii) re-setting the valve by exposing the hydrogel to water, suitably in darkness, to effect closing of the valve.

Preferably in the method according to the present teaching, the microvalve comprises a photo-responsive hydrogel comprising a copolymer comprising AA-co-BSP-A-co-NIPAM-co-MB IS.

The NIPAM based gels according to the present teaching may be used in the development of robust, passive valves in microfluidic devices. Incorporation of photo-responsive units within hydrogel-based valves allows non-invasive, external control of the valve based on the intrinsic responsiveness of the polymer to an optical stimulus.

The skilled person will appreciate that the photo-responsive gel according to the present teaching may be used in many commercial applications. For example the gels described herein may be used in the field of sampling devices (environmental sensors), biomedical microfluidic devices, autonomous environmental sensor platforms, continuous-flow microfluidics, digital microfluidics, DNA chips (microarrays), molecular biology applications, evolutionary biology, cellular biophysics, microbial behaviour, acoustic droplet injection (ADE) and fuel cells, for example.

BRIEF DESCRIPTION OF THE DRAWINGS

The present teaching will now be described with reference to the accompanying drawings in which:

FIG. 11a is an SEM of the gel with no porogen used, FIG. 11b is an SEM of the gel where 2 k PEG was used, FIG. 11c is an SEM of the gel where 20 k PEG was used;

FIG. 12(a) shows storage modulus vs shear stress of the gels prepared in accordance with Example 2 during a strain amplitude sweep (frequency 1 Hz); FIG. 12(b) shows frequency sweep for the same gels as those of FIG. 12(a);

FIG. 14 (a) shows normalised absorbance (at 480 nm) kinetic curves of the BSP re-protonation in deionised (DI) water after 20 minutes white light irradiation.

DETAILED DESCRIPTION OF THE DRAWINGS

Figure 1:
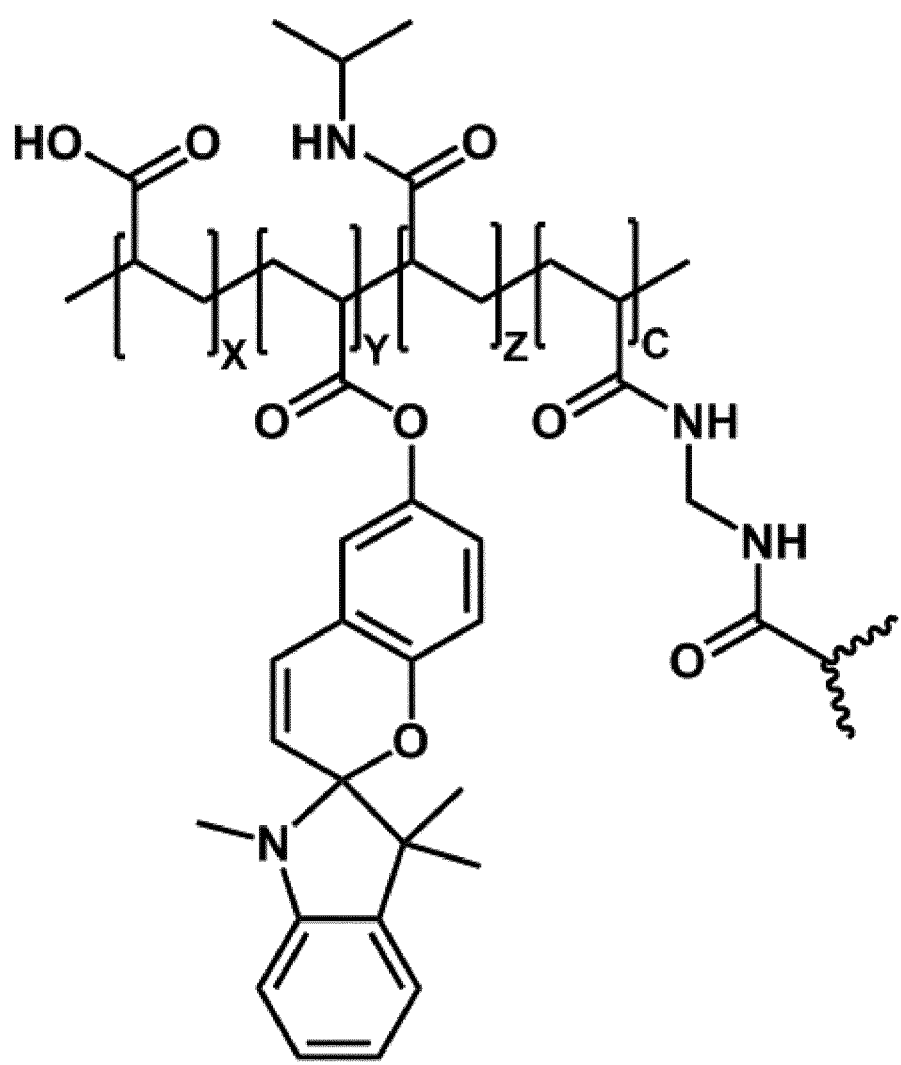
FIG. 1 is an example of a photo-responsive hydrogel comprising a copolymer of N-isopropylacrylamide (NIPAM), N,N'-methylenebisacrylamide (MBIS), benzospiropyran acrylate (BSP-A) and acrylic acid (AA)

The present teaching relates to the copolymerization of poly(N-isopropylacrylamide) with acrylated benzospiropyran in order to produce a gel which is capable of photo-induced shrinking. NIPAM gels that are currently available need to be immersed in hydrochloric acid (HCL) in order for the gel to operate.

The term "benzospiropyran" refers in general to a (substituted) 2H-1-benzopyran having a second ring system, usually heterocyclic, attached to the 2-carbon atom of the pyran in a spiro manner with a common tetrahedral carbon atom. Spiropyrans exist in a closed, uncharged, inactive, non-planar and colourless "benzospiropyran" form (SP) which is converted by exposure to ultraviolet (UV) light, heat or a polar solvent to an open, planar, active, highly conjugated, highly coloured "merocyanine" form (MC). Upon irradiation, the C—O spiro bond in the SP form is cleaved heterolytically and the "spiro" carbon which was $sp^3$-hybridized achieves $sp^2$ hybridization and becomes planar. The aromatic group rotates, aligns its π-orbitals with the rest of the molecule, and it forms the conjugated system of the merocyanine form, with ability to absorb photons of visible radiation, and therefore appear colorful. When the UV source is removed, the molecules gradually relax to their ground state, the carbon-oxygen bond renews, the spiro atom becomes sp³ again, and the molecule returns to its colorless state. Spiropyrans are used for their photochromic properties.

The inventors have found that the copolymerization of an acid into the gel structure provides an internal source of protons which enables the gel to self-protonate when it is placed in deionized water.

The term "self-protonates" as used herein means that when the hydrogel described herein is placed in water, preferably deionized water, the water penetrates the gel and swells the polymeric network. During this process the acid, suitably the polymeric acid, incorporated into the gel can disassociate in the presence of water. This disassociation results in acidification of the environment and consequent protonation of the merocyanine form (MC).

With regard to the structure of the polymer gel, the distribution of the acid and spiropyran acrylate comonomers is random in the polymer structure but as water is the carrier of the protons, once the gel is swollen the acid can protonate the MC units regardless of the distance between the acid monomers and the spiropyran acrylate monomers.

The term "photo-responsive hydrogel" as used herein means a hydrogel whose properties may be modified on irradiation by light. A hydrogel is a network of hydrophilic polymer chains that is able to swell and retain large amounts of water.

The hydrogel according to one aspect of the present teaching overcomes the issues with known photo-responsive hydrogels by incorporating acrylic acid (AA) co-monomer into the structure of the poly(NIPAM)-co-spiropyran. The pKa of the protonated merocyanine (MC-H+) is reported to be in the range of 6-7 (Sumaru, K.; Kameda, M.; Kanamori, T.; Shinbo, T., Characteristic Phase Transition of Aqueous Solution of Poly(N-isopropylacrylamide) Functionalized with Spirobenzopyran. *Macromolecules* 2004, 37, 4949-4955) and therefore acrylic acid which has a pKa=4.2 (S. Chaterji, I. K. Kwon and K. Park, *Prog. Polym. Sci.*, 2007, 32, 1083-1122) acidifies the environment enough for the BSP-A→MC-H+ reaction to happen spontaneously when water hydrates the gel. The copolymerization of acrylic acid into the gel structure provides an internal source of protons which dispenses with the need to soak the gel in HCL in order for it to operate, i.e. swell when placed in deionized water and shrink when exposed to light, such as white light for example.

For example, the mechanism of action for the photo-responsive hydrogel according to one aspect of the present teaching is as described below.

Figure 3:
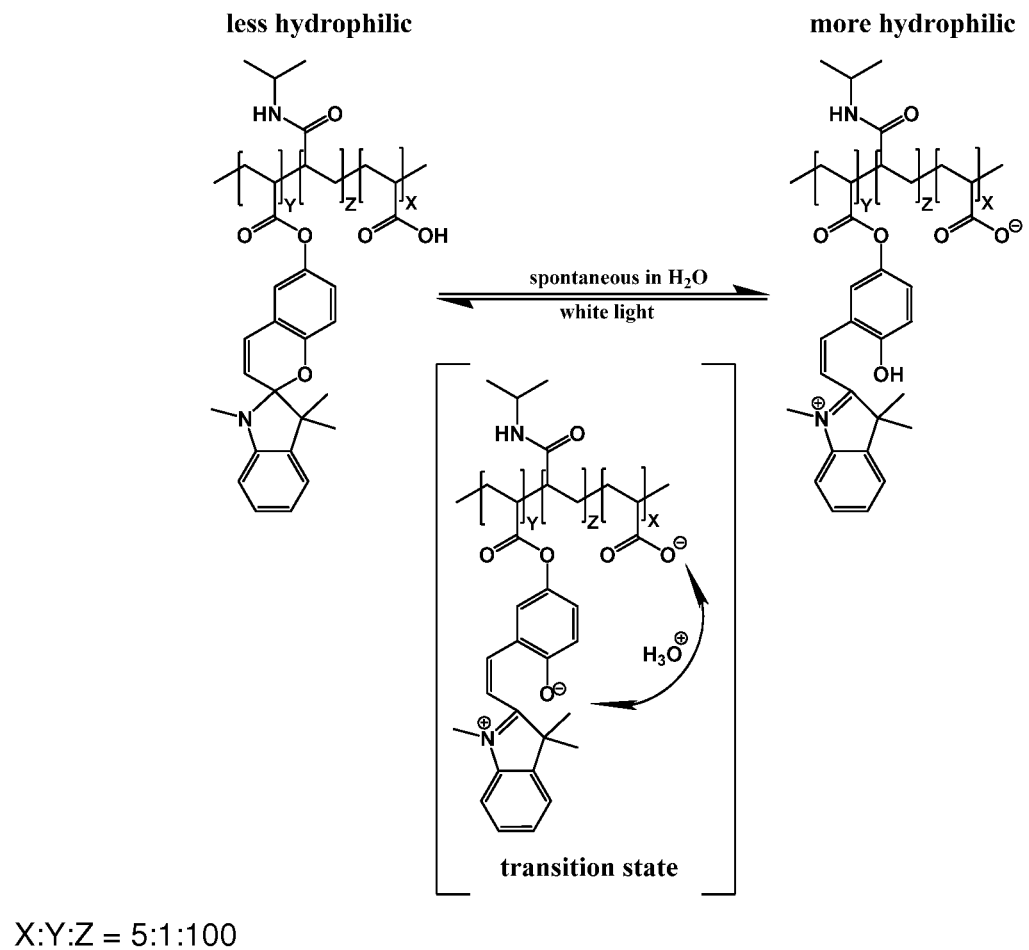
FIG. 3 is a schematic representation showing the proton exchange taking place between the acrylic acid and the benzospiropyran together with the effect of light irradiation.

With reference to the schematic representation shown in FIG. 3, when the protonated MC-H+ undergoes light induced isomerisation to BSP-A it releases the proton. The arrangement of proton donors and acceptors in the material has the effect that the acrylic acid (pKa=4.2) will protonate the BSP-A and force it to isomerise to the MC-H+ when the gel is placed in water. On the other hand, when the MC-H+ deprotonates under white light irradiation, the pH jump protonates the acrylic acid —COO— groups in the polymer. Therefore, a rather synergistic than antagonistic effect is observed on the gel shrinking when the benzospiropyran releases the proton due to white light irradiation. The schematic representation in FIG. 3 shows the proton exchange between the acrylic acid and the benzospiropyran taking place in the gel together with the effect of light irradiation.

Aspects of the present teaching will be described in more detail below and with reference to the examples.

Example 1

Preparation of Acrylic Acid-co-BSP-A-co-NIPAM-co-MBIS Gel

Materials

N-isopropylacrylamide 98% (NIPAM), Acrylic Acid 99% (AA) (180-200 ppm MEHQ (Monomethyl Ether of Hydroquinone) as inhibitor), N,N'-methylenebisacrylamide 99% (MBIS), Phenylbis(2,4,6 trimethyl benzoyl)phosphine oxide 97% (PBPO), 2-Hydroxy-2-methylpropiophenone 97% (2H2MPP) were obtained from Sigma Aldrich, Ireland and used as received. Trimethyl-6-hydroxyspiro-(2H-1-benzopyran-2,2'indoline) 99% was obtained from Acros Organics and acrylated as described in the following procedure:

0.5 g of Trimethyl-6-hydroxyspiro-(2H-1-benzopyran-2, 2'indoline) was dissolved in 20 mL of anhydrous dichloromethane in a 100 mL round bottom flask. The flask was cooled with an ethanol-liquid nitrogen bath. To the cooled mixture 0.6 mL of triethylamide was added followed by 0.2 mL of acryloyl chloride. The mixture was allowed to reach room temperature and was left stirring for 48 hours. After this time the dichloromethane solution was washed by liquid-liquid extraction using brine and sodium bicarbonate solution. The product was separated using silica column chromatography with hexane:ethyl acetate 8:1 mixture.

Gel Preparation

Table 1 below shows the composition and molar ratios of reactants used to produce the photo-responsive poly(NIPAM) gels according to the present teaching.

TABLE 1

Composition and molar ratios of reactants used to produce photo-responsive poly(NIPAM) gels.

| Sample code | AA [mol %] | BSP-A [mol %] | Crosslinker [mol %] | Intiator [mol %] | NIPAM | Solvent |
|---|---|---|---|---|---|---|
| 0-0 | 0 | 0 | 3 | 1 | 200 mg | 500 µL |
| 0-1 | 0 | 1 | 3 | 1 | 200 mg | 500 µL |
| 1-1 | 1 | 1 | 3 | 1 | 200 mg | 500 µL |
| 2-1 | 2 | 1 | 3 | 1 | 200 mg | 500 µL |
| 2-2 | 2 | 2 | 3 | 1 | 200 mg | 500 µL |
| 5-1 | 5 | 1 | 3 | 1 | 200 mg | 500 µL |
| 5-2 | 5 | 2 | 3 | 1 | 200 mg | 500 µL |
| 5-3 | 5 | 3 | 3 | 1 | 200 mg | 500 µL |

For each composition, 200 mg of NIPAM was mixed with 3 mol % equivalents of MBIS and the given amount (see Table 1) of AA and spiropyran acrylate BSP-A. These were then dissolved in 500 µL of 1,4-dioxane/water mixture (4:1 by volume). To this mixture 50 µL of the initiator solution was added (76 mg of PBPO in 500 µL acetone). This mixture was poured onto a PDMS (PolyDimethylsiloxane) mould containing circular pits with various sizes, covered with a glass microscope slide and polymerised for 30 min with white light. The white light source was a Dolan-Jenner-Industries Fiber-Lite LMI with two gooseneck waveguides pointing at the mould from 10 cm above. The polymerised gels were swollen in deionised water that was changed twice. After 24 h the gels were swollen and equilibrated and cut into 3 mm circles. The gels were tested as set out below. All measurements were done on such pretreated gels.

The present teaching demonstrates that it is particularly advantageous to use white light for polymerisation of monomers with spiropyran using the PBPO initiator. The white light forces the BSP-A to close to the colourless form allowing more radiation to be absorbed by the initiator. Experiments conducted by the present inventors using other benzospiropyran acrylates (especially those bearing an $NO_2$ group, for example) show that under UV irradiation the opening of BSP-A to the MC form and the resulting intense colouration blocks the excitation light and prevents the polymerization from occurring. It will be understood therefore, that the use of white light for the polymerization of the gels according to the present teaching is particularly advantageous.

Gel Shrinking Measurements

For expressing the light induced shrinking a relative dimension percent change is used. As the gel cannot shrink more than when it is in its dried state, for every formulation the dried gel diameter was determined as the 0% swelling and the fully equilibrated state in water as 100% swelling. This approach also allows excluding the differences in swelling and deswelling that can be induced by the composition-related different polymerisation degree of the gels and compare the effects coming directly from the AA and BSP-A. Therefore, the percent of swelling is calculated with the following equation:

$$D = 1 - \left[\frac{\left(1 - \frac{d_x}{d_{sw}}\right)}{\left(1 - \frac{d_{dr}}{d_{sw}}\right)}\right] \cdot 100\%$$

$d_x$—measured diameter; $d_{sw}$—diameter of fully swollen gel; $d_{dr}$—diameter of gel dried at room temperature for 3 days.

For white light irradiation and shrinking measurements the hydrogels were placed in a 5 mm wide and 2 mm deep PDMS (PolyDimethylsiloxane) mould filled with water and covered with another PDMS 2 mm thick slide. The imaging was done with an Aigo GE-5 microscope using a 60× objective lens and the accompanying software. The light was provided by a Dolan-Jenner-Industrie Fiber-Lite LMI at maximum power through two waveguide goosenecks.

UV-Vis Spectroscopy

UV-Vis spectroscopy was used to study the colours of the benzospiropyran hydrogels under different illumination conditions. The absorbance spectra were recorded in reflectance mode using a fibre-optic light guide connected to a Miniature Fiber Optic Spectrometer (USB4000—Ocean Optics) and a specially designed probe holder. The light source was a LS-1 tungsten halogen lamp (white light) obtained from Ocean Optics, Inc. Data from the spectrometer was processed using Spectrasuite software provided by Ocean Optics Inc. For clarity, the absorbance spectra recorded were smoothed using Origin software using Savitzky-Golay algorithm.

Figure 2:
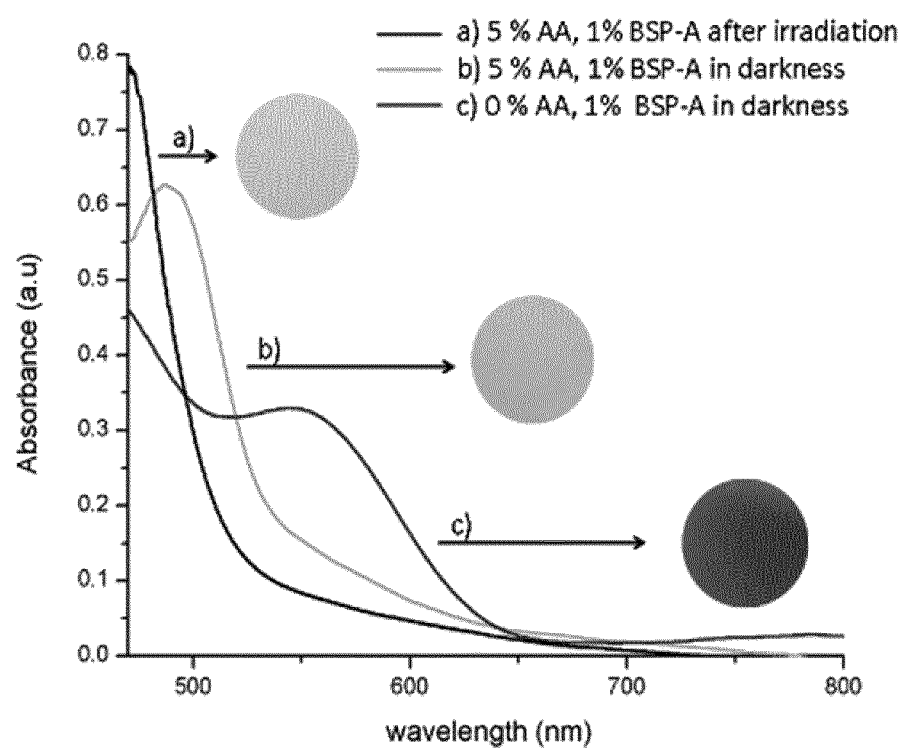
FIG. 2 shows UV-Vis spectra of the 1% BSP-A gels. a) 5% AA, 1% BSP-A gel after irradiation with white light; b) 5% AA, 1% BSP-A gel kept in deionised water in darkness; c) 0% AA, 1% BSP-A gel soaked in deionised in water in darkness.

With reference to FIG. 2 and Table 1, the first experiments dealing with light induced shrinking were conducted with the 0-1 gels containing no AA (Acrylic Acid) and 1% BSP-A (acrylated benzospiropyran). These gels, when placed in deionised water and in darkness, turn red upon swelling indicating the opening of the BSP-A to the MC form without protonation of the MC. Under white light irradiation this gel decolourises but exhibits minimal shrinking comparable to the blank poly(NIPAM) gel. The same gel soaked in 1 mM HCl exhibits considerable shrinking under white light as previously reported for such systems. (Sugiura, S.; Sumaru, K.; Ohi, K.; Hiroki, K.; Takagi, T.; Kanamori, T. *Sensors and Actuators A: Physical* 2007, 140, (2), 176-184) This suggests that the shrinking of these gels is induced more by the deprotonation and closing of the MC-H+ than the isomerisation of the MC into BSP-A itself.

The poly(NIPAM) blank gel appeared to shrink under white light irradiation. The light source used to actuate the gels, although being cold, LED light, induced a small degree of heating to the gel and surrounding water due to absorption of incandescent radiation. The temperature rose from the initial 18° C. to 22° C. during the 20 min of measurement. Therefore, because poly(NIPAM) gels are thermo-responsive and have been shown to shrink slightly in a temperature range several degrees below the actual LOST temperature (C. Wu and S. Zhou, *Macromolecules*, 1997, 30, 574-576; X. S. Wu, A. S. Hoffman and P. Yager, *J. Polym. Sci., Part A: Polym. Chem.*, 1992, 30, 2121-2129; X.-Z. Zhang, Y.-Y. Yang, T.-S. Chung and K.-X. Ma, *Langmuir*, 2001, 17, 6094-6099) a slight shrinkage of the blank poly(NIPAM) gels was observed.

Table 1 above shows the compositions of the hydrogels tested. The amount of AA (acrylic acid) was varied along with BSP-A content to determine the ratio that results in highest degree and/or speed of shrinking. Since these were the only parameters changing in these experiments—the gels were named "gel[amount of AA mol %]-[amount of BSP-A mol %]" e.g. gel 2-1 has 2 mol % AA and 1 mol % BSP-A with regards to NIPAM.

Figure 4:
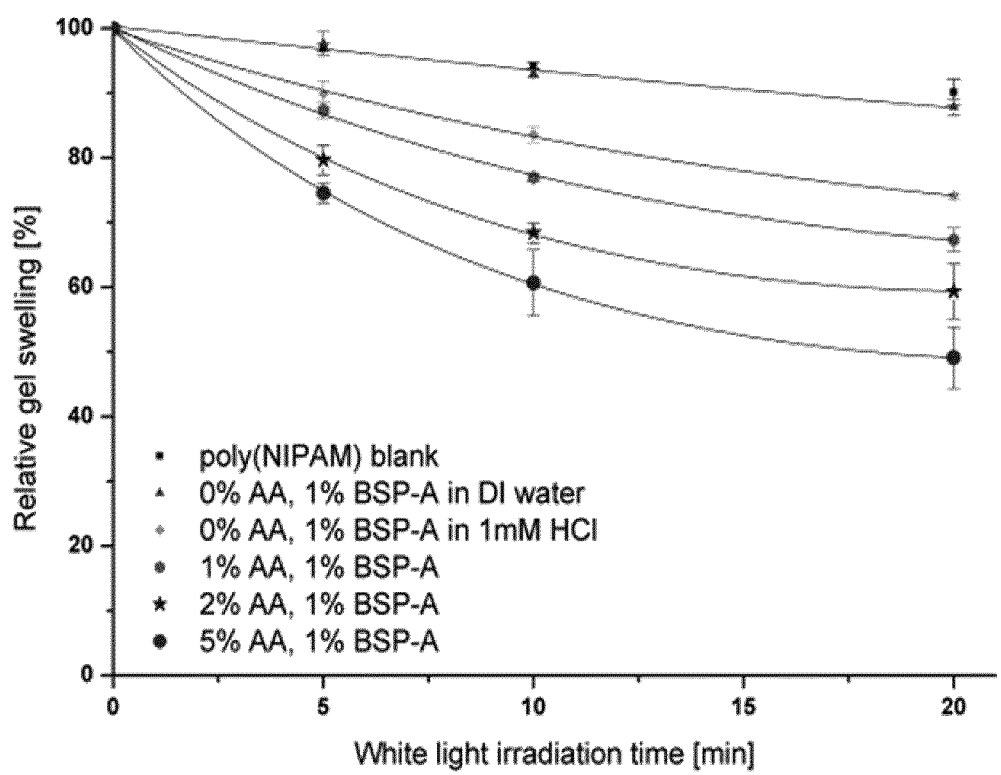
FIG. 4 is a graph showing the shrinking of gels containing 1% of benzospiropyran acrylate and varying amounts of acrylic acid. Minutes indicate time under white light irradiation.

The results demonstrate that the gels according to the present teaching do not require soaking in HCl. When placed in deionised water and in darkness a yellow colouration of the gels can be observed within 5-10 minutes. Moreover, as shown in FIG. 4, the shrinking of the acrylic acid (AA) modified gels is both faster and larger than the same composition of 0-1 gel soaked in HCl for protonation. Therefore, the results demonstrate that surprisingly, the incorporation of acrylic acid (AA) into these gels simplifies the process required for their actuation.

Composition Optimization

Figure 5:
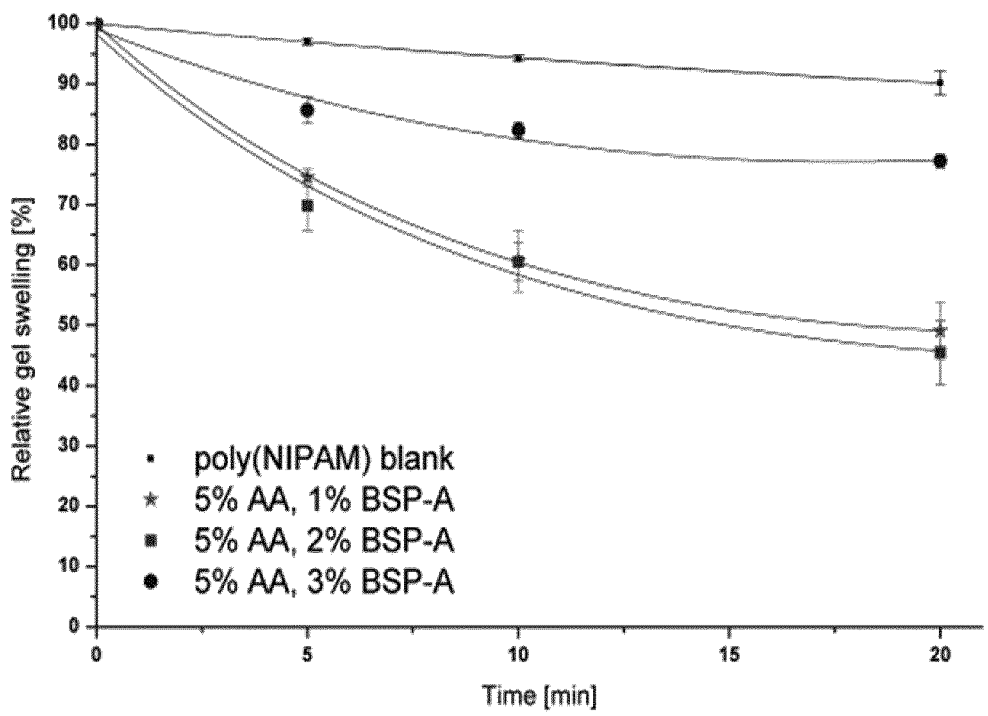
FIG. 5 is a graph showing the shrinking of gels containing varying amounts of benzospiropyran acrylate. Minutes indicate time under white light irradiation.

One might consider that the more BSP-A is added to the gel the faster and greater the light induced actuation. However, the results in FIG. 5 show that there is an optimum BSP-A amount in the poly(NIPAM) that induces the actuation of the gel. 1-2% of BSP-A is shown to be the optimum amount of photochrome in the polymer as 3% of BSP-A causes the gel to shrink less.

The re-swelling rates of the gels according to the present teaching were also tested and optimised. The gels from Table 1 after the experiments with white light induced shrinking were kept for 1 hour in the dark and their size was measured again. With reference to the results shown in Table 2, the optimum composition can be readily selected. Gels with 2 and 3% BSP-A did not reswell to the original size within the given hour, reaching 83% and 76% of swelling respectively. The gels with 1% BSP-A reswelled up to 96-97% of their original size. This clearly shows that there is a compromise between the shrinking degree and speed of reswelling. This can be explained by the fact that BSP-A, regardless of the isomerisation state, is a rather hydrophobic molecule that, at higher concentrations, renders the gel less prone for water uptake.

TABLE 2

Swelling values [relative %] for gels in Table 1 after 20 min under white light and after 1 h in the dark

| sample | 20 [min] (Vis. light) | std dev | 60 [min] (in darkness) | std dev |
|---|---|---|---|---|
| poly(NIPAM) blank | 87.85% | 1.18 | 97.44% | 1.60 |
| 1% AA, 1% BSP-A | 67.33% | 1.85 | 100.45% | 0.64 |
| 2% AA, 1% BSP-A | 59.37% | 4.26 | 96.48% | 1.34 |
| 5% AA, 1% BSP-A | 49.10% | 4.73 | 97.35% | 1.93 |
| 2% AA, 2% BSP-A | 61.31% | 5.20 | 83.69% | 1.27 |
| 5% AA, 2% BSP-A | 45.50% | 5.33 | 82.69% | 3.33 |
| 5% AA, 3% BSP-A | 77.22% | 1.12 | 76.44% | 1.46 |

Figure 6:
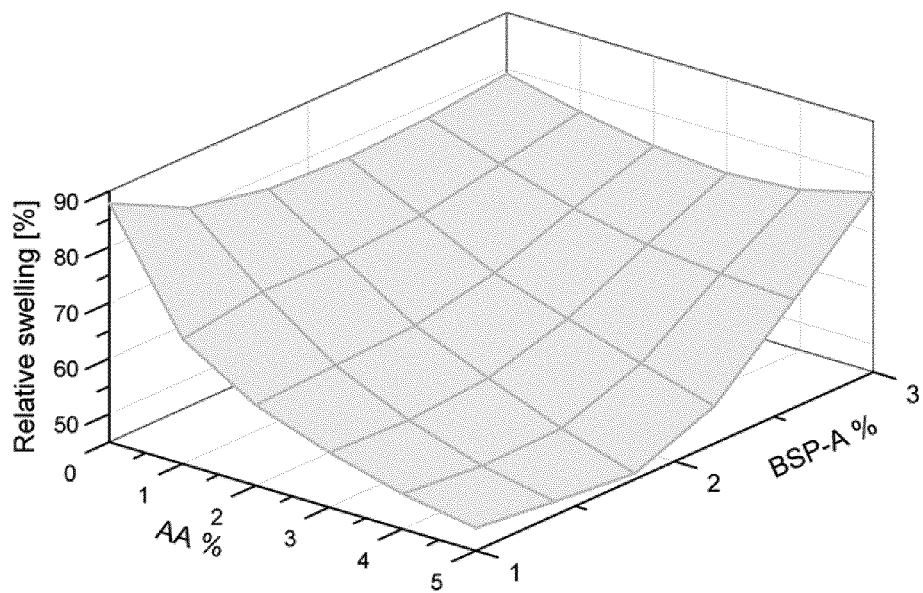
FIG. 6 is a 3D graph showing the relative swelling after 20 minutes of white light irradiation of the hydrogels plotted against their compositions. AA—acrylic acid content; BSP-A—spiropyran content.

The photo-induced shrinking of the gels plotted versus their composition can be seen on a 3D graph in FIG. 6. The results clearly show that there is a minimum (maximum in shrinking) between 1 and 2% BSP-A in the polymer. Moreover, the positive effect of acrylic acid (AA) seems to be reaching a plateau as the content increases to 5%.

Gel Robustness Studies

Figure 7:
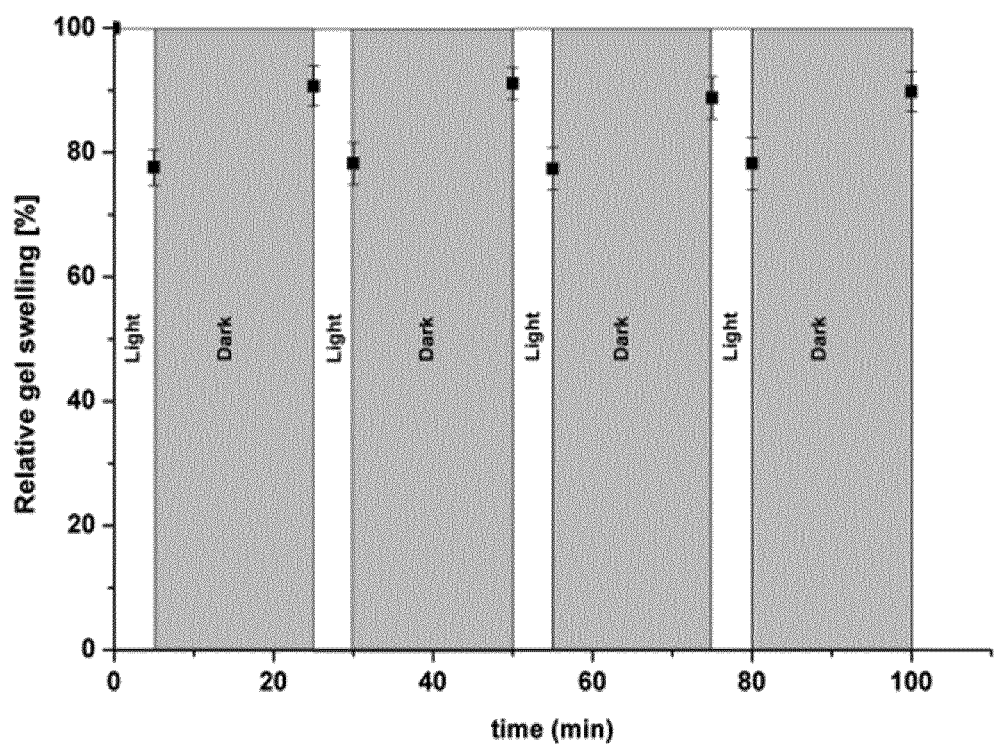
FIG. 7 shows alternating light (5 min) and dark (20 min) cycles for the gel containing 5% AA and 1% BSP-A.

It will be understood that an important parameter with regard to the efficacy of a gel provided in accordance with the present teaching is its robustness. As a demonstration of this parameter and as will be described with reference to FIG. 7, the 5-1 gel formulation, i.e. 5 mol % AA and 1 mol % BSP-A was tested for stability versus light/dark cycles. The 5-1 gel shrunk about 20% within 5 min of white light irradiation and then reswelled back to around 90% in darkness. This process was repeated 4 times and was reproducible as shown in FIG. 7.

Figure 8:
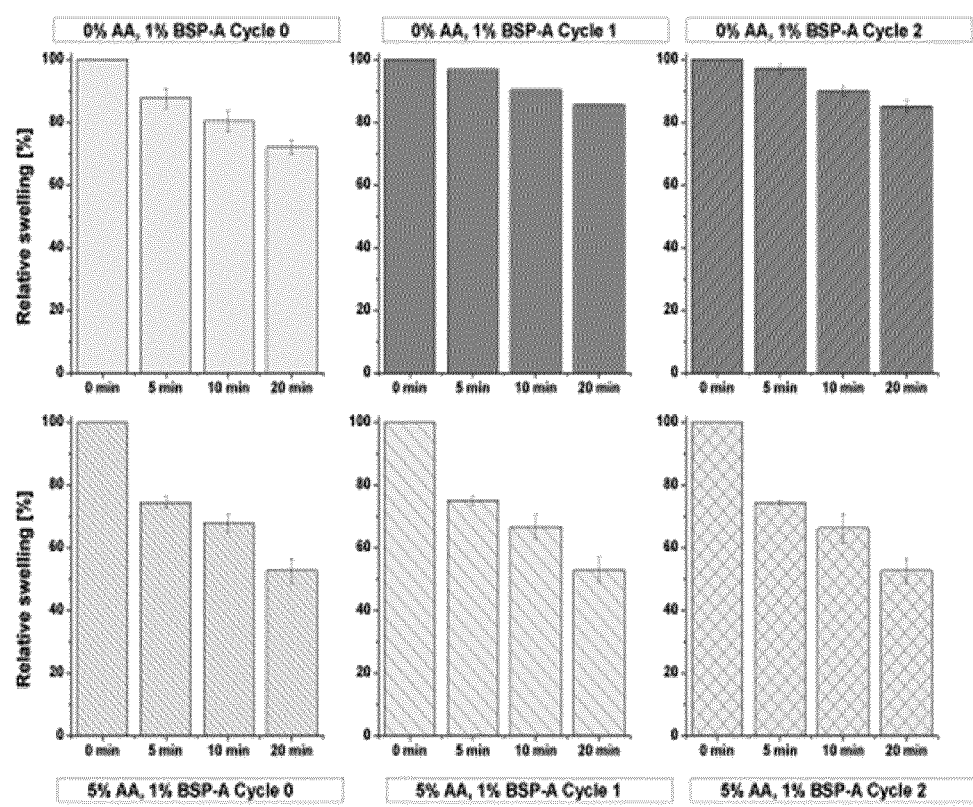
FIG. 8 is a set of graphs showing light induced shrinking of the 5-1 and the 0-1 gels after cycles of drying and reswelling in deionised water. The 0-1 gel was initially protonated in 1 mM HCl. The minutes indicate the time under white light irradiation.

The robustness of the gels and particularly the self-protonating stability was also tested. The 5-1 gels were shrunk with white light, then dried for 48 hours at room temperature and then reswelled in deionised water and their photo-induced shrinking was measured again. Such drying/reswelling cycle was done twice and showed impressive reproducibility of the photo—shrinking ability of the 5-1 gel formulation. On the other hand gels containing 1% BSP-A and no acrylic acid that have been soaked in 1 mM HCl for protonation shrink much less after the first drying/reswelling cycle in water and loose their photo-actuation ability after the second cycle. These results are presented in FIG. 8.

Stability Tests

Figure 9:
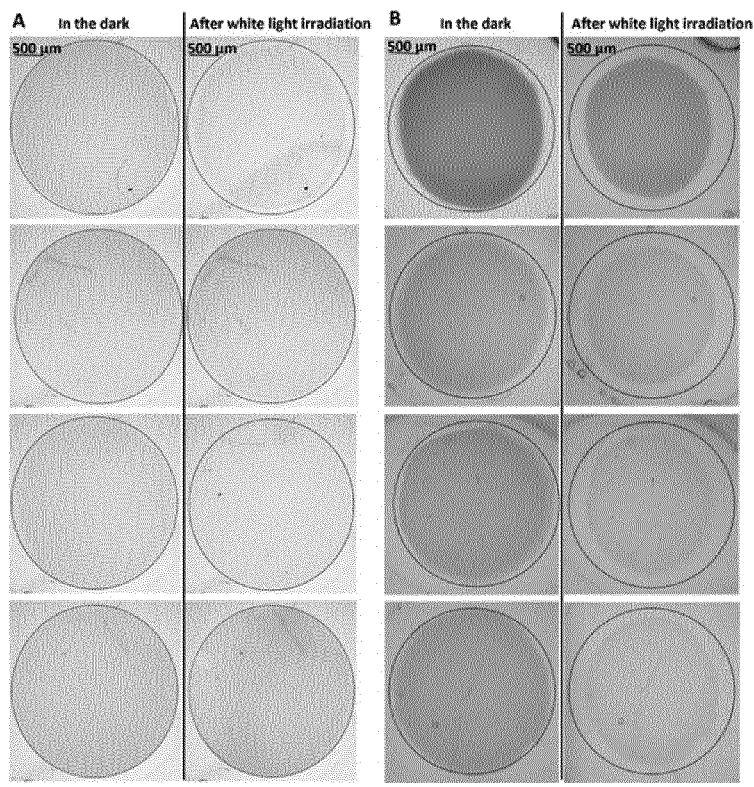
FIG. 9 shows light induced shrinking and reswelling cycles for A: 0% AA, 1% BSP-A (left) and B: 5% AA, 1% BSP-A (right)

Further experiments were conducted to check how stable the gels described herein are towards washing with water. The 5-1 gels (containing 5% AA and 1% BSP-A) were swollen in deionised water, shrunk with white light and then kept in fresh deionised water for 24 hours in the dark. The light induced shrinking was then measured again. This procedure was repeated 4 times. Similar measurements were carried out on the 0-1 samples (containing 0% AA and 1% BSP-A) but before the first measurement the samples were soaked in 1 mM HCl to protonate the BSP-A contained in those gels. The results in FIG. 9 show that the 5-1 gel can undergo light induced shrinking even after it was reswollen 3 times in DI water. In contrast, the 0-1 gel loses its photo-responsive character after two washes. Moreover, a red colouration can be seen after 2 washes of the 0-1 gel indicating that the BSP-A is opening but only to the non-protonated MC form due to the insufficient acidity of the environment. Whereas the 5-1 gel keeps the yellow colour indicating that the BSP-A is still opening to the protonated MC-H+ form. After 4 washes the pH of the water of equilibrated gels was 5.8 for both 5-1 and 0-1 gels. This suggests that the AA modification of the gels has a pH buffering effect for the environment within the gel. As long as there is no competing counter ion for the —COO— groups the charge neutrality rule prevents the protons from leaving the gel. These protons shuttle between the MC+ and COO— groups depending on the application of the light stimulus as proposed in the schematic representation discussed above.

During the stability studies some of the samples were kept in 20 ml vials filled with deionised water for over 2 months. Despite that the water was changed 5 times, the randomly selected 5-1 and 2-2 gels kept their photo-responsive shrinking ability. This demonstrates that these formulations are much more robust and stable compared to the standard known NIPAM-co-BSP-A gels. Such improvements allow these materials to be used in real-life applications, for example in many microfluidic devices that operate at pH below 7, for example autonomous environmental phosphate detection systems.

The examples and the test results discussed above show that the gels according to the present teaching self-protonate in deionised water and can be actuated repeatedly even after being washed many times with water, or dried and re-swollen. The re-swelling speeds for the 3 mm gel disks prepared in accordance with the Example 1 were around 60 minutes. With reference to the example below, the re-swelling performance of the gels described above was improved by introducing porosity into the poly(NIPAM) gels prepared above.

It has been demonstrated that poly(NIPAM) gels shrink and re-swell significantly faster if they are porous (Wu, X. S.; Hoffman, A. S.; Yager, P. J. *Polym. Sci., Part A: Polym. Chem.* 1992, 30, (10), 2121-2129; Zhang, X.-Z.; Yang, Y.-Y.; Chung, T.-S.; Ma, K.-X. *Langmuir* 2001, 17, (20), 6094-6099; Li, L.; Du, X.; Deng, J.; Yang, W. *React. Funct. Polym.* 2011, 71, (9), 972-979).

In the example below, poly(ethylene glycol) of two molecular weights was used as a pore forming agent and combined with the benzospiropyran-NIPAM-acrylic acid gels described above to produce porous, photo-responsive and self-protonating soft hydrogel actuators. The porosity was analysed with Scanning Electron Microscopy. The photo-induced size shrinking and re-swelling of the gels was measured together with the UV-Vis spectra of the re-swelling gels.

Example 2

Preparation of Porous Acrylic Acid-co-BSP-A-co-NIPAM-co-MBIS Gels

Materials

N-isopropylacrylamide 98% (NIPAM), Acrylic Acid 99% (AA) (180-200 ppm MEHQ as inhibitor), N,N'-methylenebisacrylamide 99% (MBIS), Phenylbis(2,4,6 trimethyl benzoyl)phosphine oxide 97% (PBPO), poly(ethylene glycol) Mw=2000 g/mol and Mw=20 000 g/mol were obtained from Sigma Aldrich, Ireland and used as received. Trimethyl-6-hydroxyspiro-(2H-1-benzopyran-2,2'indoline) 99% was obtained from Acros Organics and acrylated as described in Example 1.

Gel Preparation

For the hydrogel synthesis, 200 mg (1 mol equiv.) of NIPAM was mixed with 3 mol % equiv. of MBIS and the given amount (see Table 3) of AA and benzospiropyran acrylate (BSP-A). These compounds were then dissolved in 500 μL of 1,4-dioxane/water mixture (4:1 vol:vol) in which a given amount of PEG was previously dissolved. To this mixture 1 mol % equiv. of the photo-initiator (PBPO) was added. This cocktail was poured onto a PDMS mould containing circular pits with various sizes, covered with a glass microscope slide and polymerised for 30 min under white light. The white light source used was a Dolan-Jenner-Industries Fiber-Lite™ LMI LED lamp with an intensity of 780 lumens projected through two gooseneck waveguides placed at a distance of 10 cm from the mould. The light intensity measured with a Multicomp LX-1309 light meter was ~30 kLux. The polymerised gels were allowed to swell in deionised water that was changed 3 times with 4 h intervals until no colouration of the supernatant could be observed. Removal of the PEG porogen was confirmed by Raman spectroscopy. After 24 h the swollen and equilibrated gels were cut into 3 mm discs using a manual puncher. All measurements were performed on gels produced according to this protocol.

TABLE 3

Compositions of samples tested

| | Blank gel | 2k gel | 20k gel |
|---|---|---|---|
| AA [mol %] | 5 | 5 | 5 |
| BSP-A [mol %] | 1 | 1 | 1 |
| MBIS [mol %] | 3 | 3 | 3 |
| PBPO [mol %] | 1 | 1 | 1 |
| NIPAM [mg] | 200 | 200 | 200 |
| PEG 2k [mg] | — | 400 | — |
| PEG 20k [mg] | — | — | 200 |
| Solvent [µL] | 500 | 500 | 500 |

Gel Shrinking Measurements

For white light irritation and shrinking measurements the hydrogels were placed in a 5 mm wide and 2 mm deep PDMS mould filled with water and covered with another PDMS 2 mm thick slide. The imaging was done with an Aigo GE-5 microscope using a 60× objective lens and the accompanying software. The light was provided by a Dolan-Jenner-Industrie Fiber-Lite™ LMI at maximum power through two waveguide goosenecks placed 5 cm from the sample. The swelling ratio was calculated using the following equation:

$$d = \frac{d_x}{d_0}$$

$d_x$—measured diameter; $d_0$—diameter of a fully swollen gel

SEM Analysis

The hydrogel samples were first swollen in deionised (DI) water, then frozen with liquid nitrogen and subsequently freeze-dried using a Labconco freeze-drier, model 7750060. The samples were kept for 24 hours at 0.035 mBar pressure and temperature of −40° C.

The freeze-dried hydrogels were cut in half to reveal the cross section and imaged using scanning electron microscopy (SEM) performed on a Carl Zeiss EVOLS 15 system at an accelerating voltage between 14.64-17.78 V. Samples were placed onto silicon wafers and coated with 10 nm of gold layer prior to imaging. During the imaging process, the stage was tilted at an angle between 0-15° for better imaging of the cross section of the hydrogels.

Rheology

Rheology measurements on the DI water equilibrated samples were carried out with an Anton Paar™ MCR 301 rheometer using a PP15 parallel plate tool 15 mm diameter. The amplitude sweep tests were done at 1 Hz frequency and a normal force of 0.1 N. The frequency sweeps were done at 0.1% strain from 100 Hz to 0.1 Hz and normal force of 0.1 N.

UV-Vis Spectroscopy

UV-Vis spectroscopy was used to study the colours of the benzospiropyran hydrogels under different illumination conditions. The absorbance spectra were recorded in reflectance mode using a fibre-optic light guide connected to a Miniature Fiber Optic Spectrometer (USB4000—Ocean Optics) and a specially designed probe holder The light source was a LS-1 tungsten halogen lamp (white light) obtained from Ocean Optics, Inc. Data from the spectrometer was processed using Spectrasuite software provided by Ocean Optics Inc. For clarity, the absorbance spectra recorded were smoothed using Origin software using Savitzky-Golay algorithm.

Porous Acrylic Acid-co-BSP-A-co-NIPAM-co-MBIS Gels

Figure 10:
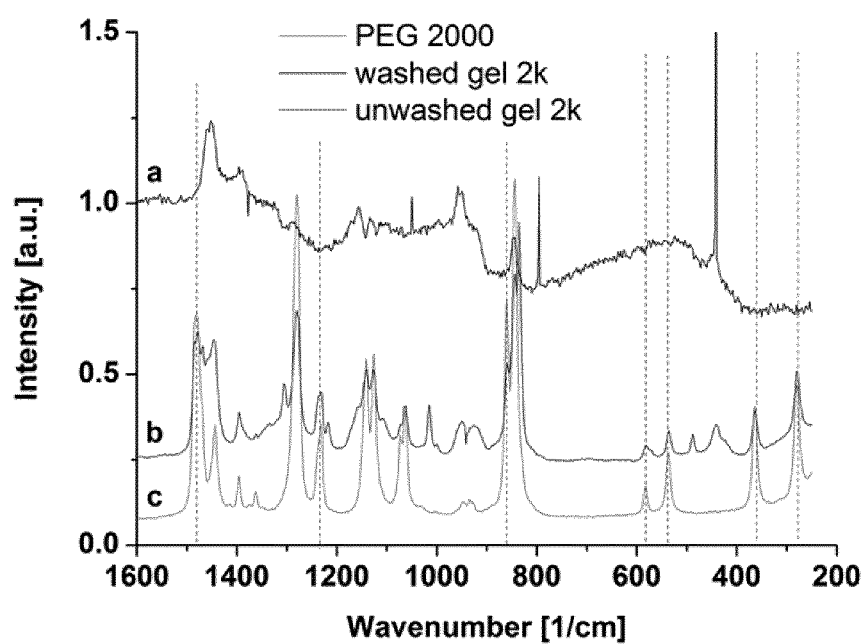
FIG. 10 shows a Raman Spectra of the porous poly (NIPAM)-co-BSP-A-co-AA-co-MBIS gel following soaking in deionized water to wash out the PEG porogen.

When a PEG solution is used as a medium for polymerisation of NIPAM gel a porous network is formed because the PEG polymer chains are occupying space without taking part in the polymerisation process. In comparison to the blank gels that are transparent at all times, the porous gels are partially transparent after polymerisation and turn completely opaque after equilibrating in water. This observation can constitute the first indication of pores present in the gel. After the synthesis the PEG porogen could be easily washed out from the gels by soaking in deionised water as confirmed by Raman spectroscopy and as shown in FIG. 10.

Figure 11A:
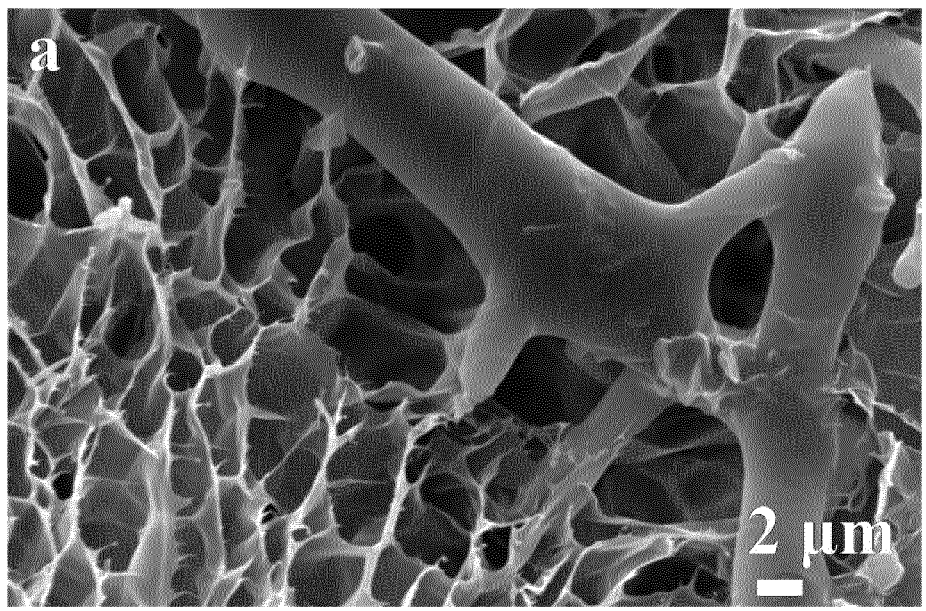
FIGS. 11a, 11b and 11c show SEM images of freeze dried gels.
Figure 11B:
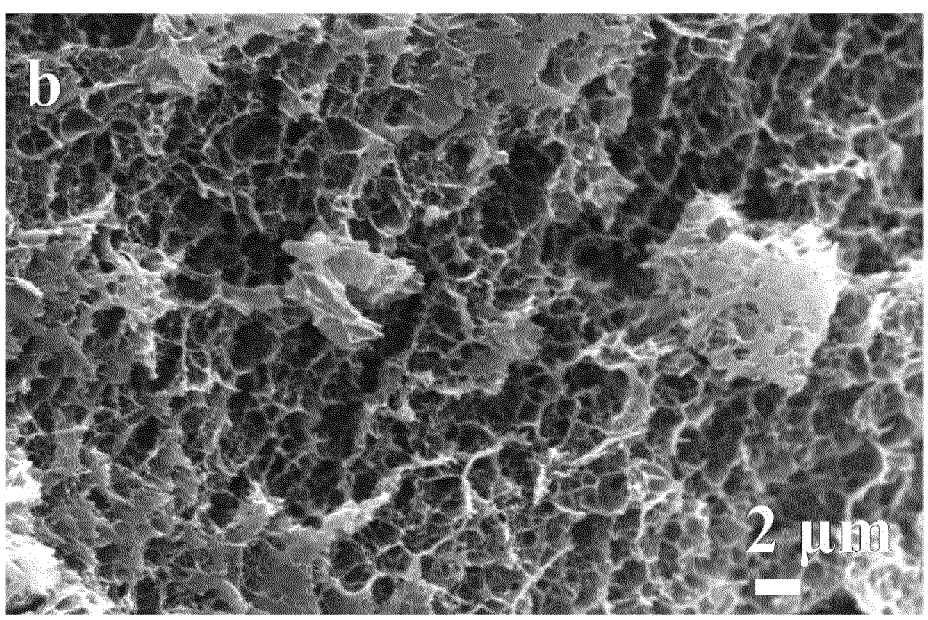
Figure 11C:
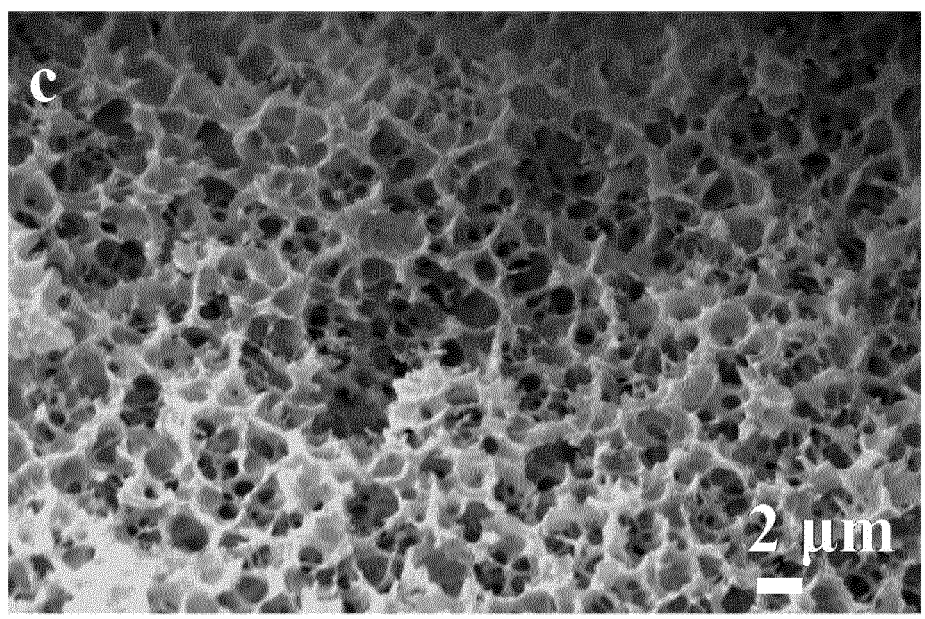

After equilibration and washing with DI water some of the gels were freeze dried. The SEM images of cross sections of the freeze-dried gels can be seen in FIGS. 11a, 11b and 11c. It can be seen that even for the samples without the PEG porogen pore-like structures are formed as previously shown by others. (Zhang, X.-Z.; Yang, Y.-Y.; Chung, T.-S.; Ma, K.-X. Langmuir 2001, 17, (20), 6094-6099; Li, L.; Du, X.; Deng, J.; Yang, W. React. Funct. Polym. 2011, 71, (9), 972-979.) This is expected for freeze-dried samples as the sublimated water leaves empty spaces behind and allows imaging the gel as it is in its hydrated/swollen state. In the case of the samples prepared in this example, the size of features in the blank gel varies significantly with smaller pore-like features being in the range of ~2 µm (FIG. 11a). With reference to FIG. 11b, photos of the 2 k gel reveal much smaller patterns formed compared to the blank gel. The size of the pore-like features in the 2K gel is <2 µm. This might allow easier water passage in and out from the gel with respect to the non-porous gel due to a higher surface/volume ratio. Finally, the photos of 20 k gels reveal the most homogenous and clear porous character of all the gels. Given the magnification of the photo in FIG. 11c it can be expected that the pores are <1 um in diameter.

Mechanical Stability of the Gels

It is known that porosity often lowers the mechanical stability of gels compared to their non-porous equivalents. In the case of the gels of the present teaching this phenomenon demonstrates itself already in the fact that the freshly polymerised porous gels swell more in DI water (30% in diameter) than the blank gels (20% in diameter). Higher water content and lower polymer (and BSP-A) content in the fully swollen state results in the decreased mechanical strength of the porous gels (FIG. 12). Despite the lower modulus of the porous gels and smaller linear viscoelastic shear stress range (FIG. 12a) compared to the blank gel, the porous gels still possess mechanical moduli within acceptable limits (~$10^4$ Pa) reported for swollen hydrogels (Anseth, K. S.; Bowman, C. N.; Brannon-Peppas, L. *Biomaterials* 1996, 17, (17), 1647-1657).

Light Induced Shrinking and Reswelling of the Gels

Figure 13:
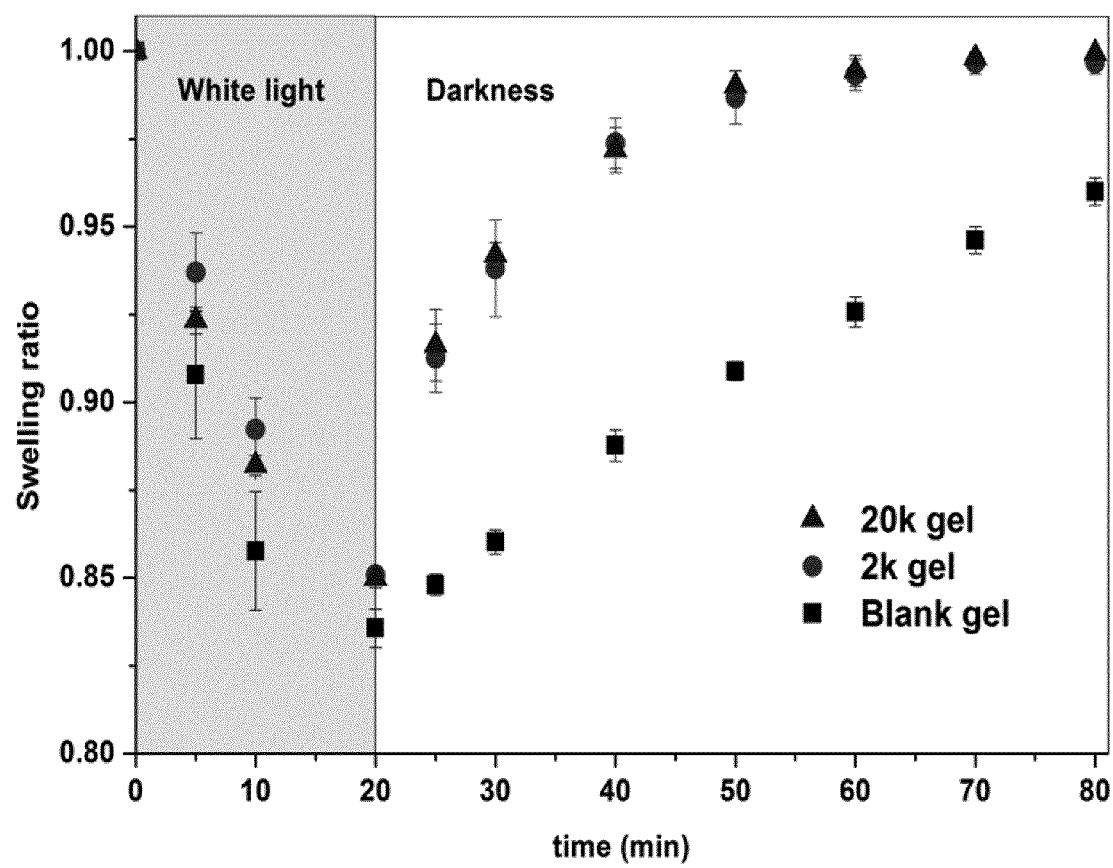
FIG. 13 shows light induced shrinking and reswelling in the dark for poly(NIPAM)-co-BSP-A-co-AA-co-MBIS porous gels prepared in accordance with Example 2.

With reference to FIG. 13, the results demonstrate that the light induced shrinking of these porous gels is a faster process than reswelling and is slightly affected by the presence of pores. In fact, the volume decrease is smaller for the porous gels than for the blank gel. This can be explained by the fact that, the porous gels swell more after polymerisation than the blank gels. This results in a lower overall concentration of BSP-A in the gel/water. As discussed above, the BSP-A content has a significant effect on the speed and degree of shrinking of the gels according to the present teaching. Moreover, in the more swollen gels a smaller mass of polymer has to expel a higher mass of water to reach the same shrinking ratio as the blank. On the other hand, as shown in FIG. 13, significant differences between the blank and porous gels were observed during the reswelling part of the experiment. The blank gels needed more than an hour to re-swell to its initial state and the swelling ratio increase seemed to be almost linear with time. In contrast the porous gels reached 97% of the initial diameter (~4 mm) within 20 minutes after the light has been switched off.

Figures 14A, 14B:
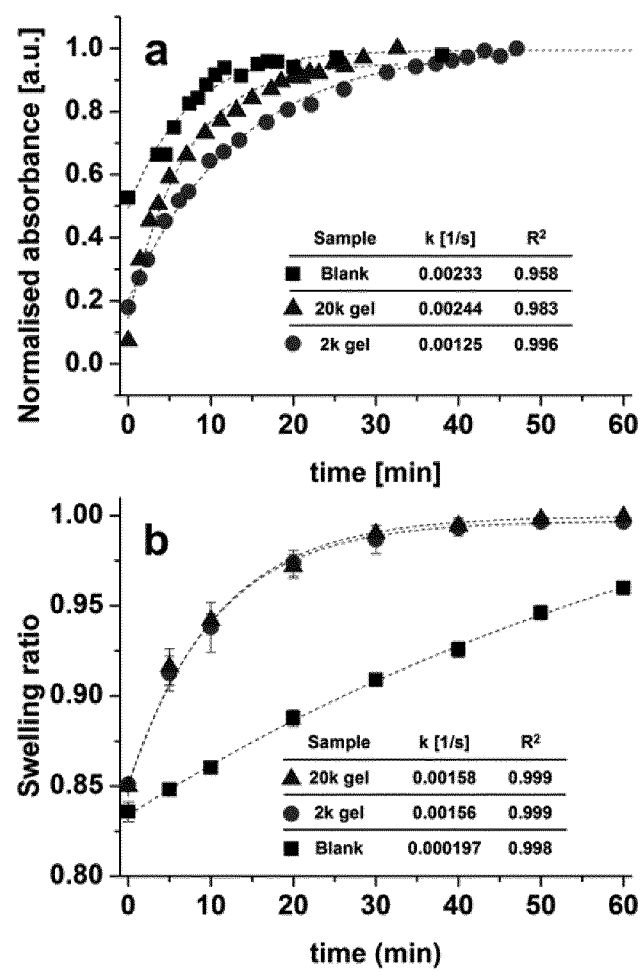
FIG. 14(b) shows re-swelling of the gels during the re-protonation process in deionised (DI) water after 20 minutes white light irradiation.

Surprisingly, the different molecular weight of pore forming PEGs used did not affect the reswelling speed between the porous gels. Moreover, the UV-Vis spectroscopy carried out on the same gels shows that the kinetics of BSP-A opening and protonation is similar and does not seem to depend greatly on the presence of pores (FIG. 14a). On the other hand, the re-swelling kinetics shown in FIG. 14b reveal that the non-porous gel re-swelling speed is an order of magnitude slower than the porous gels. Given the fact that for the non-porous gels the protonation kinetics is an order of magnitude higher than the reswelling kinetics one can presume that in this case the reswelling is a diffusion limited process. However for the porous gels, the reswelling kinetic constants are in the same range as the protonation kinetic constants (~$1-2 \times 10^{-3}$ [1/s]). As the reswelling speed does not seem to depend on the pore size it is speculated that in the case of the porous gels according to the present teaching, the reswelling is no longer diffusion limited but dependant on the rate of BSP-A→MC-H$^+$ reaction.

These results demonstrate that the gels provided in accordance with the present teaching can function not only as a reversible photoactuator as discussed above but may be used as a fast "on/off" microfluidic soft actuator valve.

Figure 15:
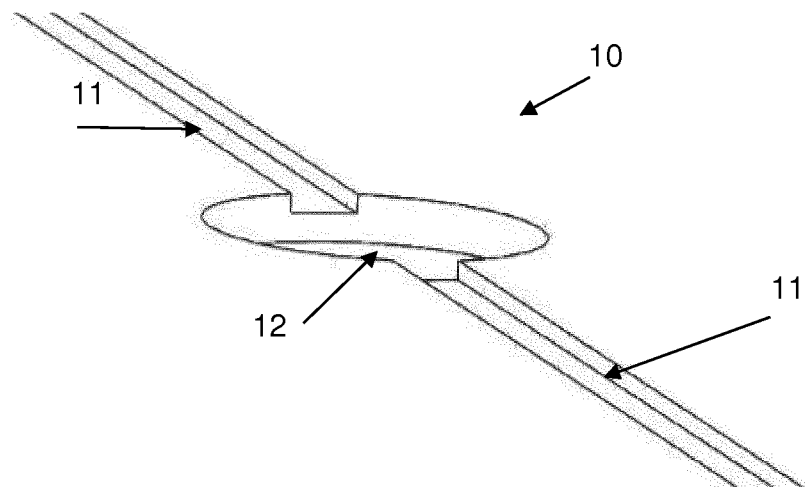
FIG. 15 is a schematic showing the design of the lower part of a microfluidic channel with a compartment for a photoresponsive gel.

For example, with reference to FIG. 15, a microfluidic manifold 10 incorporating the hydrogel according to the present teaching as a passive valve may be prepared. Two methods of preparation may be used for the manufacture of the lower part 11 of a microfluidic channel with a circular compartment 12 for the gel as shown in FIG. 15.

For example, in the first method, a monomer mixture comprising N-isopropylacrylamide, a cross-linker (such as N,N'-methylenebisacrylamide (MBIS), for example), a photoinitiator (such as PBO for example), an acid having a pKa less than 6 (such as acrylic acid, for example), and benzospiropyran acrylate is poured into the circular compartment 12 and polymerized, preferably with white light. After polymerization an upper part (not shown) of the microfluidic manifold is bonded to the lower part 11 to form a microfluidic channel. The upper part of the microfluidic manifold may be a glass or polymer cover plate layer. When water is passed through such a channel, the gel swells, blocks the channel and becomes operational.

Alternatively, in a second method, the gel may be polymerized separately, outside of the microfluidic channel, whereby the gel is placed in moulds of similar shape to the circular component 12 of the microfluidic channel shown in FIG. 15. The size of the mould is suitably designed so that the polymerized gel, after swelling, fits into the microfluidic valve compartment of a microfluidic device. The polymerized gel is swollen, washed and then dried to decrease the size. The dried gel may then be placed into the compartment and sealed with the upper layer plate (not shown) in a manner similar to the first method described above.

Example 3

Preparation of Micro-Sized Porous Acrylic Acid-co-BSP-A-co-NIPAM-co-MBIS Gels

Materials

N-isopropylacrylamide 98% (NIPAM), Acrylic Acid 99% (AA) (180-200 ppm MEHQ as inhibitor), N,N'-methylenebisacrylamide 99% (MBIS), Phenylbis(2,4,6 trimethyl benzoyl)phosphine oxide 97% (PBPO), were obtained from Sigma Aldrich, Ireland and used as received. Trimethyl-6-hydroxyspiro-(2H-1-benzopyran-2,2'indoline) 99% was obtained from Acros Organics and acrylated as described in Example 1.

Gel Preparation

For the hydrogel synthesis, 200 mg (1 mol equiv.) of NIPAM was mixed with 3 mol % equiv. of MBIS and the given amount (see Table 3) of AA and benzospiropyran acrylate (BSP-A). These compounds were then dissolved in 500 μL of different solvent mixtures (e.g. 1,4-dioxane/water mixture (1:1, 2:1, 4:1 vol:vol), acetone/water (1:1, 2:1, 4:1 vol:vol), tetrahydrofuran/water (1:1, 2:1, 4:1 vol:vol), acetonitrile/water (1:1, 2:1, 4:1 vol:vol). To this mixture 1 mol equiv. of the photo-initiator (PBPO) was added. The hydrogels were polymerised using an in-house made cell, which consisted of one upper 1H,1H,2H,2H-perfluorodecyl-triethoxysilane functionalised glass slide and a bare glass slide at the bottom. The spacer size was set between 50-500 μm and the in-house made cell was capillary filled with the monomeric cocktail and subsequently exposed to white light irradiation for polymerization through a photo-mask for pre-determined periods of time ranging from 1 second-3 minutes. The white light source used was a Dolan-Jenner-Industries Fiber-Lite™ LMI LED lamp with an intensity of 780 lumens projected through two gooseneck waveguides placed at a distance of 10 cm from the mask. The light intensity measured with a Multicomp LX-1309 light meter was ~30 kLux. The polymerised gels were allowed to swell in deionised water that was changed 3 times with 4 h intervals until no colouration of the supernatant could be observed. All measurements were performed on gels produced according to this protocol.

Gel Shrinking Measurements

For white light irritation and shrinking measurements the hydrogels were placed in a 5 mm wide and 1 mm deep PDMS mould filled with water and covered with a thin cover glass slide. The imaging was done with an Aigo GE-5 microscope using a 60× objective lens and the accompanying software. The light was provided by a Dolan-Jenner-Industrie Fiber-Lite™ LMI at maximum power through two waveguide goosenecks placed 5 cm from the sample. The swelling ratio was calculated using the following equation:

$$\text{shrinking \%} = \frac{d_x}{d_0} \cdot 100\%$$

$d_x$—measured diameter; $d_0$—diameter of a fully swollen gel

Light Induced Shrinking and Reswelling of the Gels

Figure 17:
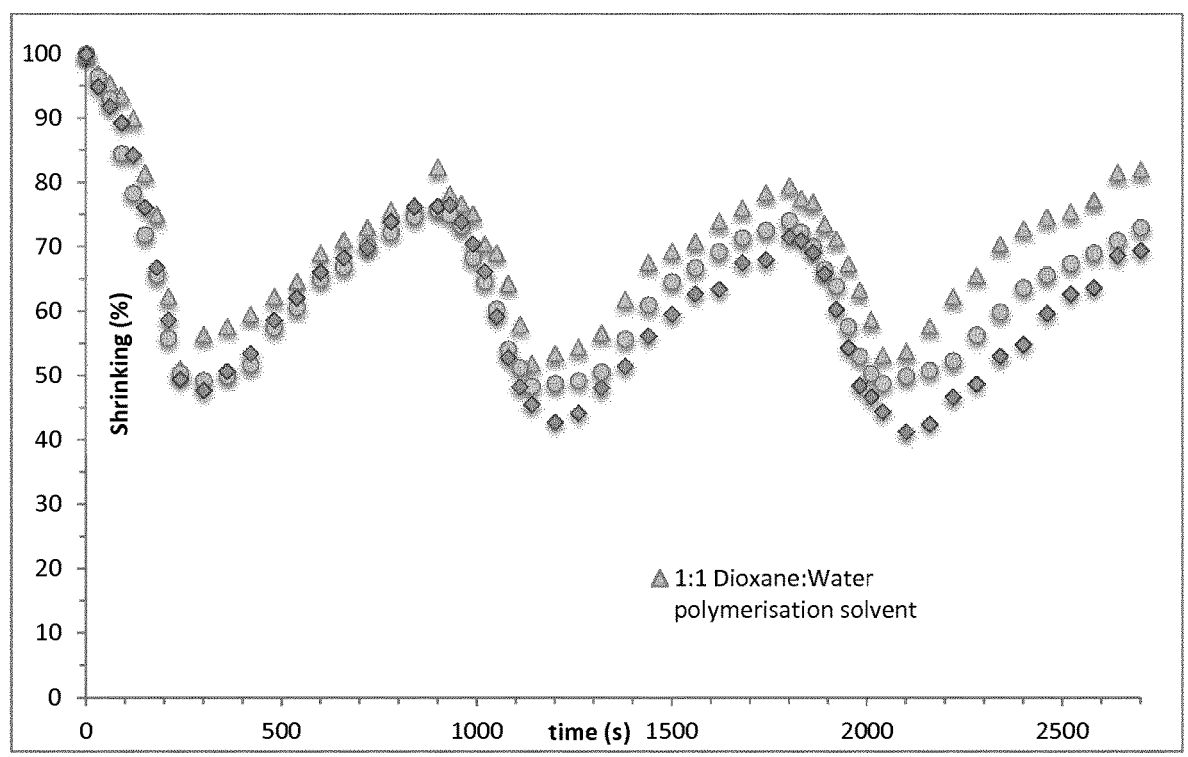
FIG. 17 shows a graph demonstrating repeatability of shrinking and expansion of a micro-structured hydrogel provided in accordance with the present teaching.

With reference to FIG. 17, the results demonstrate that the light induced shrinking of these porous gels is repeatable and highly reproducible.

These results demonstrate that the gels provided in accordance with the present teaching can function not only as a reversible photoactuator as discussed above but may be used as a fast "on/off" microfluidic soft actuator valve.

Figure 16:
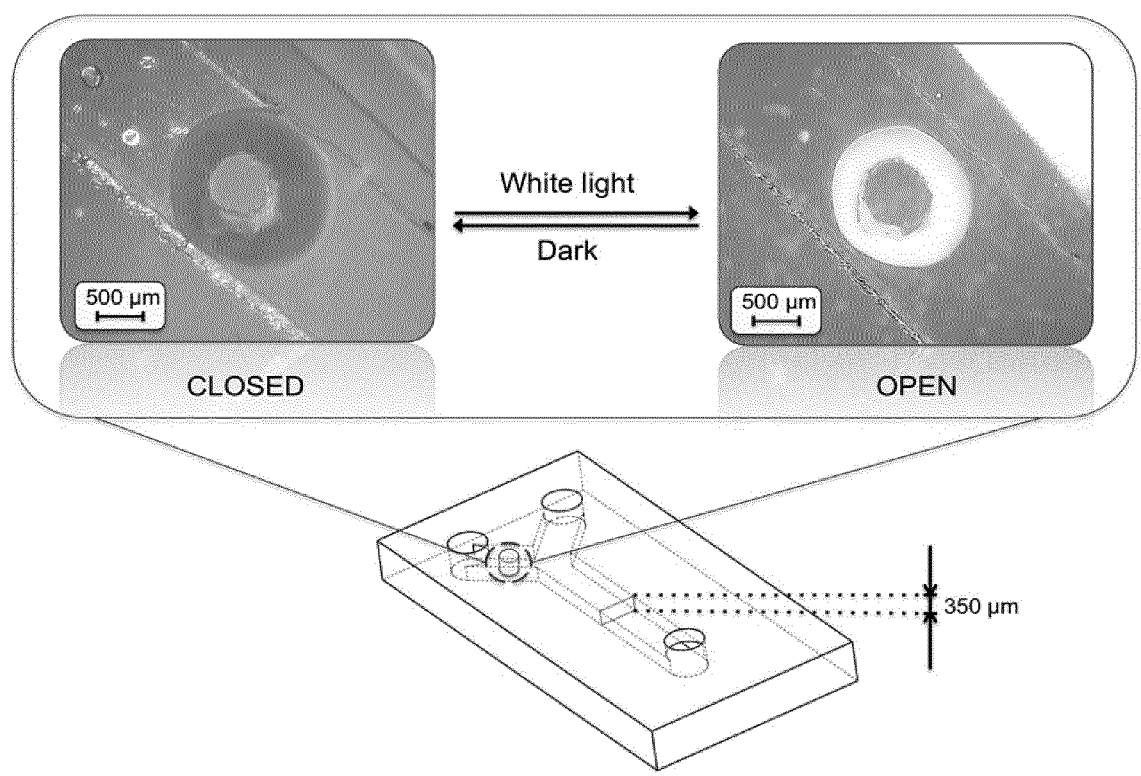
FIG. 16 is a schematic showing a microfluidic valve arrangement incorporating a valve fabricated using a photoresponsive gel in accordance with the present teaching.

FIG. 16 shows an example of a valve fabricated using a gel in accordance with the present teaching. In this arrangement a photoresponsive gel is photo-polymerised through a photo-mask within a microfluidic channel in a similar fashion to that described above. When the valve is exposed to a deionised water, it swells and adopts the "closed" configuration whereby it blocks the channel. On exposure to light, the gel reduces in volume, retracting away from the side walls of the channel to adopt the "open" configuration. In this "open" valve configuration, a path is available between the gel and the side walls of the channel through which a liquid may pass.

The opening and closing of valves provided in accordance with the present teaching is highly repeatable. FIG. 17 shows a graph of shrinking percentage (y-axis) verses time (x-axis) for multiple repeated instances of shrinking and expansion of a photoresponsive gel per the present teaching. As will be seen, the gel can be regularly and repeatedly reduced in size to about 50% of its original volume by exposure to light.

Accordingly, it will be appreciated that while exemplary aspects of the present teaching have been described with reference to the above that modifications can be made without departing from the scope of the present teaching.

The words comprises/comprising when used in this specification are to specify the presence of stated features, integers, steps or components but does not preclude the presence or addition of one or more other features, integers, steps, components or groups thereof.

REFERENCES

1. K. Sumaru, K. Ohi, T. Takagi, T. Kanamori and T. Shinbo, *Langmuir*, 2006, 22, 4353-4356.
2. A. Szilágyi, K. Sumaru, S. Sugiura, T. Takagi, T. Shinbo, M. Zrinyi and T. Kanamori, *Chem. Mater.*, 2007, 19, 2730-2732.
3. S. Sugiura, A. Szilagyi, K. Sumaru, K. Hattori, T. Takagi, G. Filipcsei, M. Zrinyi and T. Kanamori, *Lab Chip*, 2009, 9, 196-198.
4. T. Satoh, K. Sumaru, T. Takagi and T. Kanamori, *Soft Matter*, 2011, 7, 8030-8034.
5. L. Florea, D. Diamond and F. Benito-Lopez, *Macro. Mat. Eng.*, 2012, 297, 1148-1159.
6. H. G. Schild, *Prog. Polym. Sci.*, 1992, 17, 163-249.
7. C. Wu and S. Zhou, *Macromolecules*, 1997, 30, 574-576.
8. X. S. Wu, A. S. Hoffman and P. Yager, *J. Polym. Sci., Part A: Polym. Chem.*, 1992, 30, 2121-2129.
9. K. Sumaru, M. Kameda, T. Kanamori and T. Shinbo, *Macromolecules*, 2004, 37, 7854-7856.
10. S. Sugiura, K. Sumaru, K. Ohi, K. Hiroki, T. Takagi and T. Kanamori, *Sensors and Actuators A: Physical*, 2007, 140, 176-184.
11. T. Satoh, K. Sumaru, T. Takagi, K. Takai and T. Kanamori, *Phys. Chem. Chem. Phys.*, 2011, 13, 7322-7329.
12. F. Benito-Lopez, R. Byrne, A. M. Raduta, N. E. Vrana, G. McGuinness and D. Diamond, *Lab Chip*, 2010, 10, 195-201.
13. R. Byrne, S. Coleman, S. Gallagher and D. Diamond, *Phys. Chem. Chem. Phys.*, 2010, 12, 1895-1904.
14. B. Ziółkowski, Z. Ates, S. Gallagher, R. Byrne, A. Heise, K. J. Fraser and D. Diamond, *Macromol. Chem. Phys.*, 2013, n/a-n/a.
15. X.-Z. Zhang, Y.-Y. Yang, T.-S. Chung and K.-X. Ma, *Langmuir*, 2001, 17, 6094-6099.
16. S. Chaterji, I. K. Kwon and K. Park, *Prog. Polym. Sci.*, 2007, 32, 1083-1122.
17. R. Acciaro, T. Gilányi and I. Varga, *Langmuir*, 2011, 27, 7917-7925.
18. K. Sumaru, M. Kameda, T. Kanamori and T. Shinbo, *Macromolecules*, 2004, 37, 4949-4955.
19. C. Echeverria, N. A. Peppas and C. Mijangos, *Soft Matter*, 2012, 8, 337-346.
20. O. E. Philippova, D. Hourdet, R. Audebert and A. R. Khokhlov, *Macromolecules*, 1997, 30, 8278-8285.
21 Li, L.; Du, X.; Deng, J.; Yang, W. *React. Funct. Polym.* 2011, 71, (9), 972-979.
22. Anseth, K. S.; Bowman, C. N.; Brannon-Peppas, L. *Biomaterials* 1996, 17, (17), 1647-1657.
23. D. J. Beebe, J. S. Moore, J. M. Bauer, Q. Yu, R. H. Liu, C. Devadoss and B. H. Jo, *Nature*, 2000, 404, 588-590.
24. L. Dong and H. Jiang, *Soft Matter*, 2007, 3, 1223-1230.
25. G. Chen, F. Svec and D. R. Knapp, *Lab Chip*, 2008, 8, 1198-1204.
26. E. J. Geiger, A. P. Pisano and F. Svec, *Journal of Microelectromechanical Systems*, 2010, 19, 944-950.
27. C.-W. Lo, D. Zhu and H. Jiang, *Soft Matter*, 2011, 7, 5604-5609.
28 S. R. Sershen, G. A. Mensing, M. Ng, N. J. Halas, D. J. Beebe and J. L. West, *Adv. Mater.*, 2005, 17, 1366-+.
29. M. Chen, H. Huang, Y. Zhu, Z. Liu, X. Xing, F. Cheng and Y. Yu, *Applied Physics a—Materials Science & Processing*, 2011, 102, 667-672.

The invention claimed is:

1. A photo-responsive hydrogel comprising a copolymer formed from comonomers comprising:
   (i) N-isopropylacrylamide (NIPAM),
   (ii) a polymerisable unit of benzospiropyran having a polymerizable group capable of being polymerized into the copolymer backbone,
   (iii) a cross-linking agent, and
   (iv) an acid having a pKa of less than 6,
   wherein the acid comonomer (iv) is copolymerized, together with comonomers (i)-(iii), into the copolymer backbone and retains acid functionality, such that the copolymerised acid in the copolymer backbone retains a pKa of less than 6 and provides an internal source of protons for the hydrogel to self-protonate without external acidification.

2. A photo-responsive hydrogel according to claim 1 wherein said hydrogel exhibits spontaneous swelling in the dark, and photo-induced shrinking upon white light irradiation.

3. A photo-responsive hydrogel according to claim 1 wherein said polymerisable unit of benzospiropyran comprises at least one acrylate group.

4. A photo-responsive hydrogel according to claim 3 wherein said polymerisable unit of benzospiropyran comprises benzospiropyran acrylate (BSP-A).

5. A photo-responsive hydrogel according to claim 1 wherein the copolymerisable acid is selected from the group consisting of acrylic acid (AA), methacrylic acid, 2-ethylacrylic acid, 2-propylacrylic acid, 2-(Trifluoromethyl)acrylic acid, 2-(Bromomethyl)acrylic acid, 2-Bromacrylic acid, vinylsulphonic acid, 4-styrenesulfonic acid, 2-Acrylamido-2-methyl-1-propanesulfonic acid and vinylphosphonic acid.

6. A photo-responsive hydrogel according to claim 1 wherein the cross-linking agent is selected from the group consisting of N,N'-methylenebisacrylamide (MBIS), N,N'-ethylenebisacrylamide, butanediol diacrylate, hexanedioldiacrylate, poly(ethyleneglycol) diacrylate and poly(propyleneglycol) diacrylate.

7. A photo-responsive hydrogel according to claim 6 comprising a copolymer comprising acrylic acid-co-benzospiropyran acrylate-co-N-isopropylacrylamide-co-N,N'-methylenebisacrylamide (AA-co-BSP-A-co-NIPAM-co-MBIS).

8. A photo-responsive hydrogel according to claim 7 comprising NIPAM in an amount of 100 mol %; BSP-A in an amount in the range 1 to 3 mol %, acrylic acid (AA) in an amount in the range 1 to 15 mol % and MBIS in an amount in the range 0.1 to 3 mol % with all mol % being determined relative to the amount of NIPAM in mol.

9. A photo-responsive hydrogel according to claim 7 wherein the copolymer comprises AA-co-BSP-A-co-NIPAM-co-MBIS having the structure

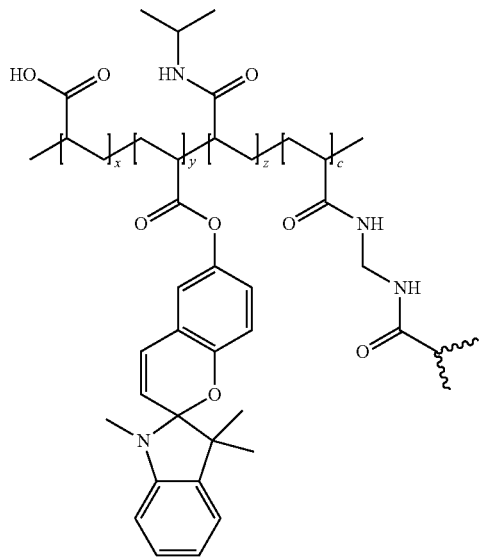

wherein X:Y:Z:C=5:1:100:3.

10. A photo-responsive hydrogel according to claim 7 wherein the gel shrinks by an amount in the range 1 to 90% upon white light irradiation for a period of 0.01 seconds to 30 minutes.

11. A photo-responsive hydrogel according to claim 8 wherein the gel comprises 1 mol % BSP-A and re-swells when in darkness to ≥50% of its initial diameter within a period of 1 to 30 minutes upon exposure to water, for a period of 15-60 minutes.

12. A photo-responsive hydrogel according to claim 1, further comprising a pore-forming agent, wherein said pore-forming agent comprises poly(ethylene glycol) having a molecular weight in the range 2,000 g/mol to 20,000 g/mol.

13. A process for the preparation of a hydrogel comprising
(a) forming a mixture of comonomers comprising (i) N-isopropylacrylamide (NIPAM), (iii) a cross-linking agent, (ii) a polymerisable unit of benzospiropyran having a polymerizable group capable of being polymerized into the copolymer backbone, and (iv) a copolymerisable acid having a pKa less than 6;
(b) dissolving said mixture in an organic solvent;
(c) adding an initiator; and
(d) polymerising the comonomers (i)-(iv) with white or UV light, to form a copolymer, wherein the acid comonomer (iv) is copolymerized, together with comonomers (i)-(iii), into the copolymer backbone and retains acid functionality, such that the copolymerised acid in the copolymer backbone retains a pKa of less than 6 and provides an internal source of protons for the hydrogel to self-protonate without external acidification.

14. A process according to claim 13 wherein the initiator comprises a white light photo-initiator or a UV-initiator.

15. A process according to claim 13 wherein the polymerisable unit of benzospiropyran comprises benzospiropyran acrylate.

16. A process according to claim 13 wherein the copolymerisable acid is selected from the group consisting of acrylic acid, methacrylic acid, 2-ethylacrylic acid, 2-propylacrylic acid, 2-(Trifluoromethyl)acrylic acid, 2-(Bromomethyl)acrylic acid, 2-Bromacrylic acid, vinylsulphonic acid, 4-styrenesulfonic acid, 2-Acrylamido-2-methyl-1-propanesulfonic acid and vinylphosphonic acid.

17. A process according to claim 13, further comprising the step of adding a pore-forming agent to said organic solvent prior to step (b), wherein said pore-forming agent comprises poly(ethylene glycol).

18. The process according to claim 13 wherein said organic solvent is 1,4-dioxane, ethanol, acetone, tetrahydrofuran (THF), dimethyl sulfoxide (DMSO), or mixtures thereof with water.

19. A method for actuating a hydrogel, comprising:
providing a photo-responsive hydrogel comprising a copolymer formed from comonomers comprising:
i) N-isopropylacrylamide (NIPAM),
ii) a polymerisable unit of benzospiropyran having a polymerizable group capable of being polymerized into the copolymer backbone,
iii) a cross-linking agent, and
iv) an acid having a pKa of less than 6,
wherein the acid comonomers (iv) is copolymerized, together with comonomers (i)-(iii), into the copolymer backbone and retains acid functionality, such that the copolymerized acid in the copolymer backbone retains a pKa of less than 6 and provides an internal source of protons; and
exposing the photo-responsive hydrogel to water such that the photo-responsive hydrogel spontaneously self-protonates, without external acidification, and expands from a first size to a second larger size.

* * * * *